US012359760B2

(12) United States Patent
Shor et al.

(10) Patent No.: US 12,359,760 B2
(45) Date of Patent: Jul. 15, 2025

(54) FLUID DISTRIBUTION JUNCTIONS AND ASSEMBLY METHODS

(71) Applicant: SaniSure, Inc., Camarillo, CA (US)

(72) Inventors: Richard Shor, Thousand Oaks, CA (US); Chris Ballew, Moorpark, CA (US); Xin-Xin Trinh, Reseda, CA (US)

(73) Assignee: SaniSure, Inc., Camarillo, CA (US)

( * ) Notice: Subject to any disclaimer, the term of this patent is extended or adjusted under 35 U.S.C. 154(b) by 0 days.

(21) Appl. No.: 18/895,756

(22) Filed: Sep. 25, 2024

(65) Prior Publication Data

US 2025/0012394 A1    Jan. 9, 2025

Related U.S. Application Data

(63) Continuation of application No. 18/661,592, filed on May 11, 2024, now Pat. No. 12,111,002.
(Continued)

(51) Int. Cl.
*F16L 41/02*  (2006.01)
*F16L 13/02*  (2006.01)
(Continued)

(52) U.S. Cl.
CPC ........... *F16L 41/02* (2013.01); *F16L 13/0281* (2013.01); *F16L 41/021* (2013.01); *F16L 41/023* (2013.01); *F16L 41/03* (2013.01); *F16L 43/02* (2013.01)

(58) Field of Classification Search
CPC ....... F16L 41/02; F16L 41/021; F16L 41/023; F16L 41/03; F16L 13/0281; F16L 43/02; F16L 33/22
See application file for complete search history.

(56) References Cited

U.S. PATENT DOCUMENTS

| 2,725,246 A | * | 11/1955 | Weinhold | F16L 33/12 |
| | | | | 285/252 |
| 6,901,948 B2 | * | 6/2005 | Nimberger | F16K 11/07 |
| | | | | 137/561 A |

(Continued)

FOREIGN PATENT DOCUMENTS

| DE | 112020006247 T5 | 10/2022 |
| JP | S60115365 | 6/1985 |
| WO | 2008086631 A1 | 7/2008 |

OTHER PUBLICATIONS

World Intellectual Property Organization, International Search Report and Written Opinion, International Application PCT/US2024/028916, mail date Jul. 1, 2024, 11 total pages.

*Primary Examiner* — Bayan Salone
(74) *Attorney, Agent, or Firm* — SoCal IP Law Group LLP; Steven C. Sereboff; Guy Cumberbatch

(57) ABSTRACT

There is disclosed fluid distribution junctions and methods of assembly therefor. Flexible conduits connect to the junctions, and a consumable subsystem of the junction, conduits and receptacle caps or other connectors may be pre-assembled for ease of use. A subassembly is formed by coupling a plurality of flexible tubular conduits to a plurality of fluid connectors of a fluid junction, the fluid junction having an inner fluid plenum chamber leading to the fluid connectors. Two shells are sandwiched on opposite sides of the subassembly, the shells having mating concave receiving surfaces that together conform around each of the fluid connectors and clamp the tubular conduits onto the circular beads. Juxtaposed joint surfaces on each pair of mating concave receiving surfaces are bonded together such as with sonic welding to make the fluid distribution junction assembly.

18 Claims, 23 Drawing Sheets

Related U.S. Application Data

(60) Provisional application No. 63/501,760, filed on May 12, 2023.

(51) Int. Cl.
    *F16L 41/03*     (2006.01)
    *F16L 43/02*     (2006.01)

(56) References Cited

U.S. PATENT DOCUMENTS

| | | | |
|---|---|---|---|
| 11,376,410 B2 * | 7/2022 | Mujwid | A61M 39/1011 |
| 11,441,713 B2 * | 9/2022 | Stankowski | F16L 33/23 |
| 11,577,953 B2 * | 2/2023 | Zumbrum | B67D 7/0288 |
| 11,708,928 B2 * | 7/2023 | Koike | F16L 47/14 |
| | | | 285/386 |
| 11,759,617 B2 * | 9/2023 | Stankowski | A61M 39/12 |
| | | | 285/18 |
| 2008/0099394 A1 * | 5/2008 | Falkner | C02F 1/006 |
| | | | 210/600 |
| 2008/0221469 A1 * | 9/2008 | Shevchuk | F16L 33/23 |
| | | | 96/10 |
| 2010/0200579 A1 * | 8/2010 | Schmidt | B29C 65/02 |
| | | | 220/601 |
| 2011/0155256 A1 * | 6/2011 | DiLorenzo | C12M 25/12 |
| | | | 137/551 |
| 2013/0257041 A1 * | 10/2013 | Peirce | F16L 33/223 |
| | | | 285/247 |
| 2014/0137519 A1 * | 5/2014 | Goodwin | B65B 3/04 |
| | | | 141/10 |
| 2014/0339715 A1 * | 11/2014 | Collins | B01F 23/232 |
| | | | 261/23.1 |
| 2018/0187809 A1 * | 7/2018 | Beus | B29C 66/7315 |
| 2018/0266600 A1 * | 9/2018 | Stankowski | F16L 33/23 |
| 2019/0143093 A1 * | 5/2019 | Zumbrum | B29C 66/73921 |
| | | | 138/99 |
| 2020/0180938 A1 * | 6/2020 | Zumbrum | B65B 37/06 |
| 2022/0288375 A1 * | 9/2022 | Mujwid | A61F 2/26 |
| 2023/0045298 A1 | 9/2023 | Koike et al. | |

\* cited by examiner (c) 2024 SaniSure, Inc.

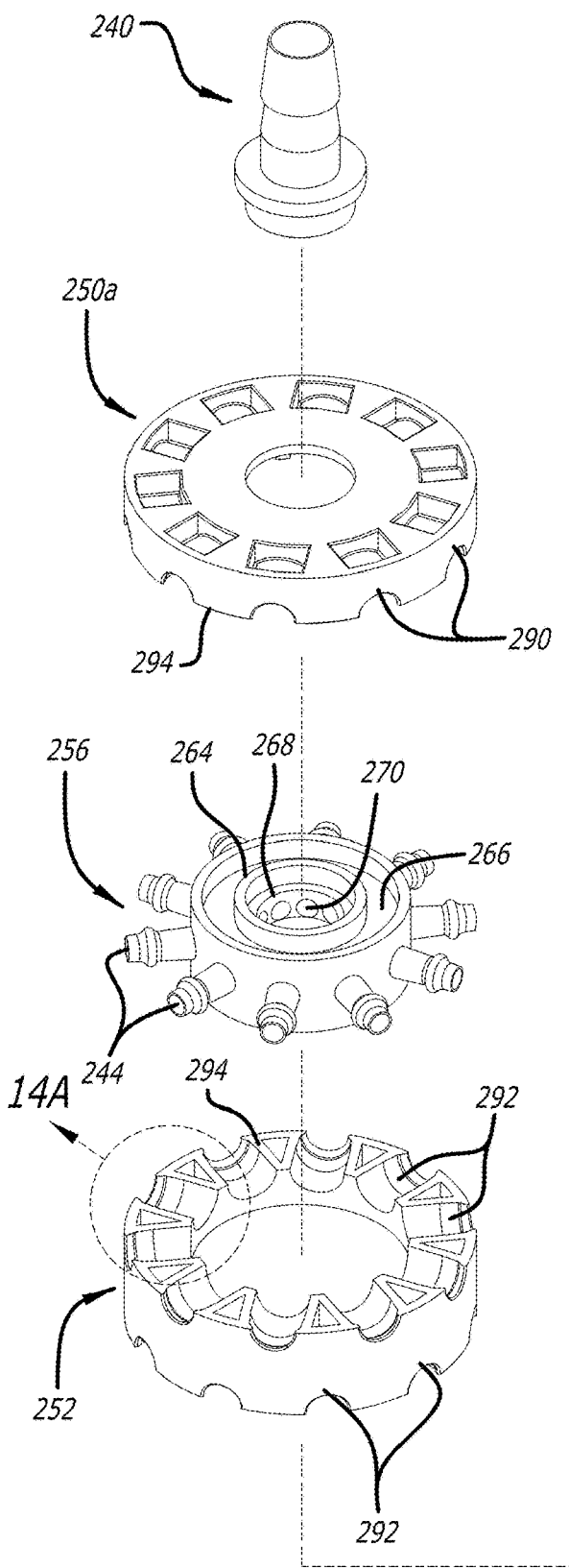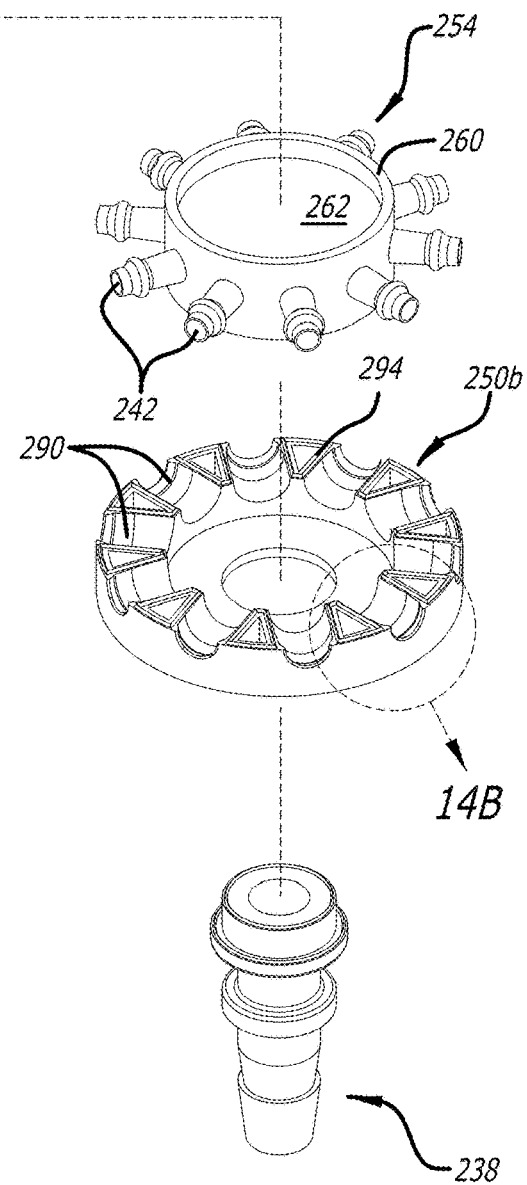
FIG. 14

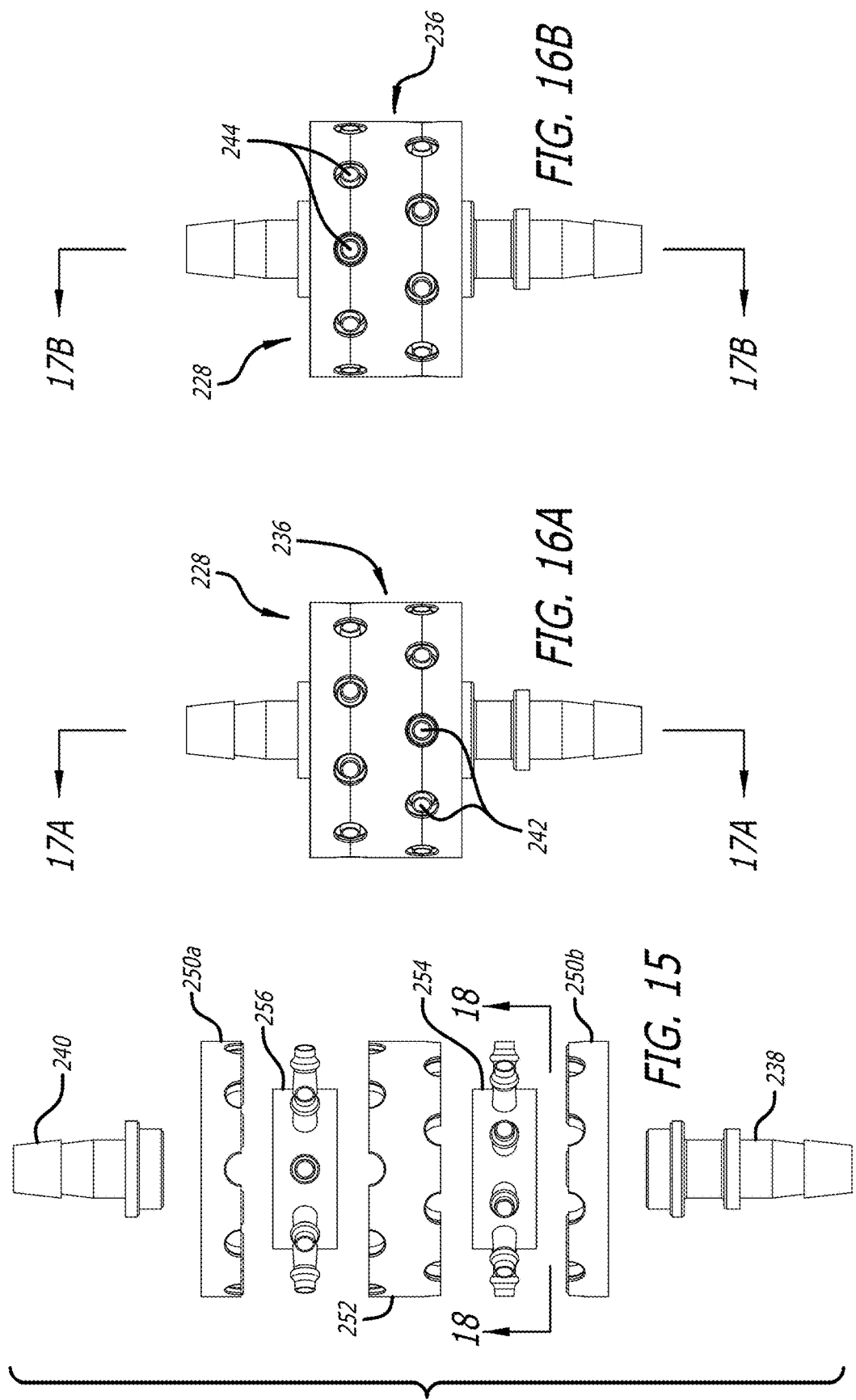

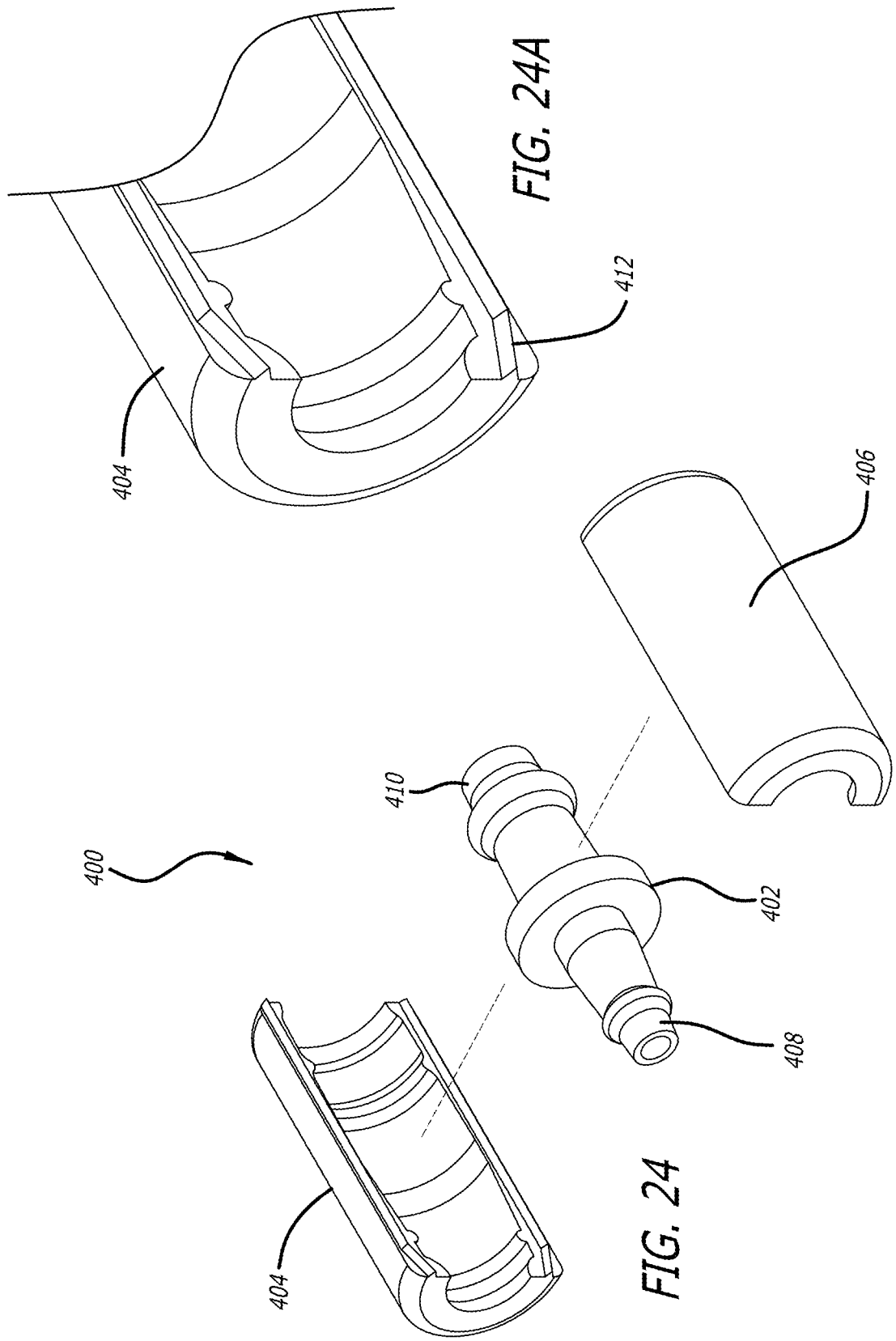

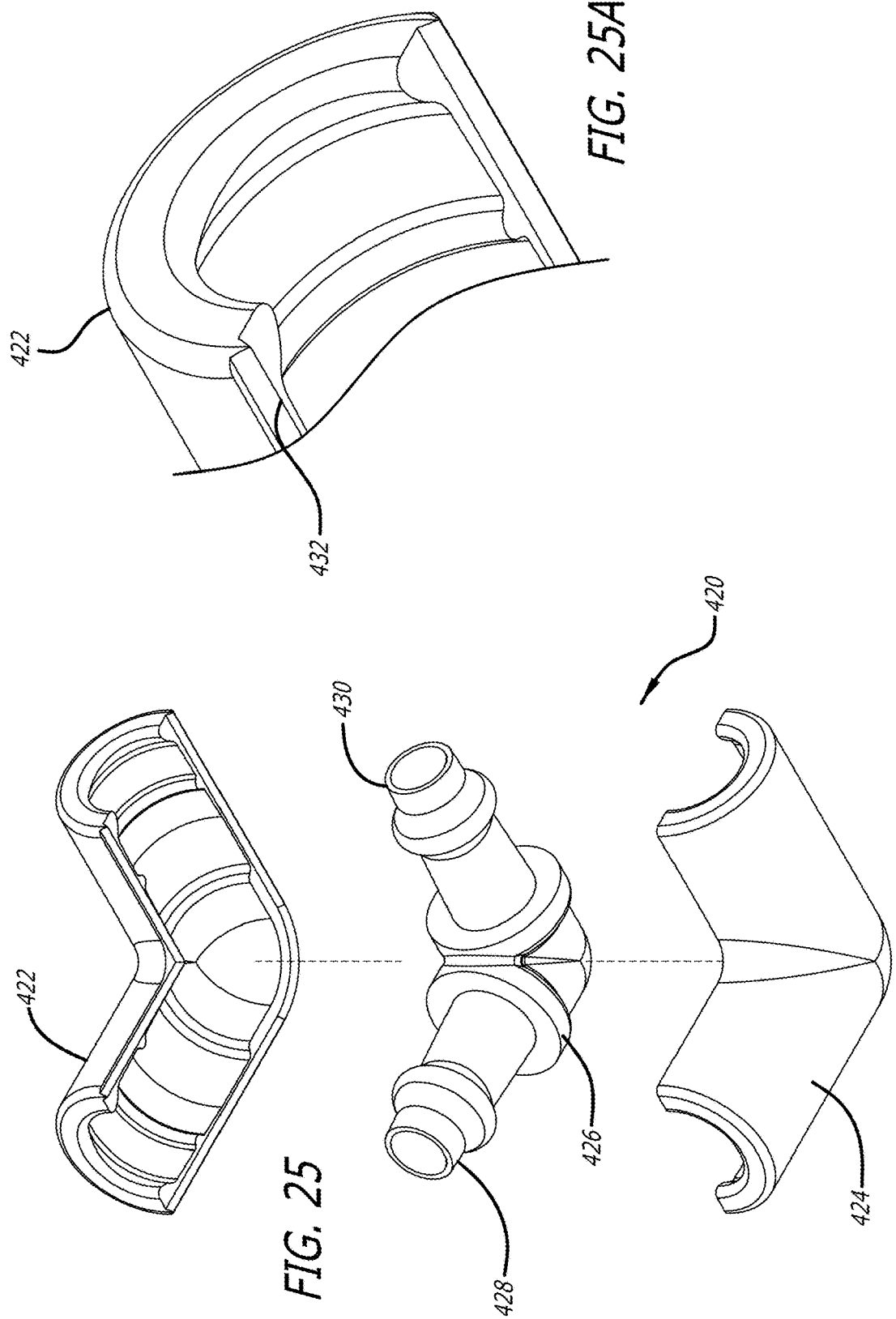

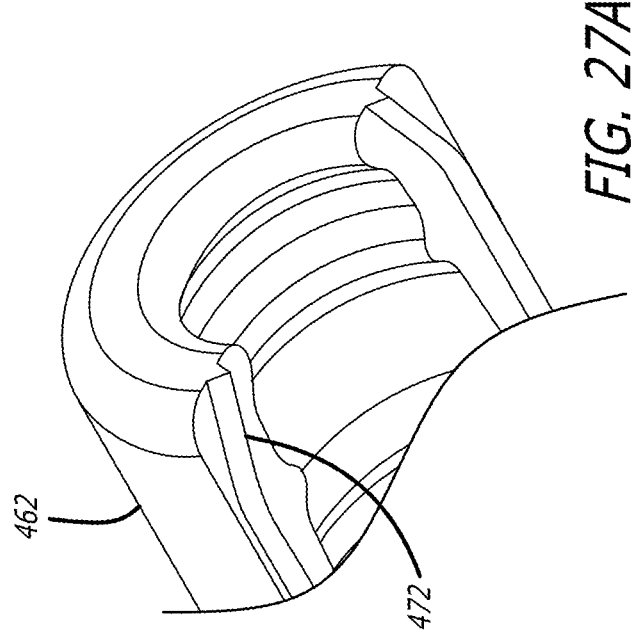
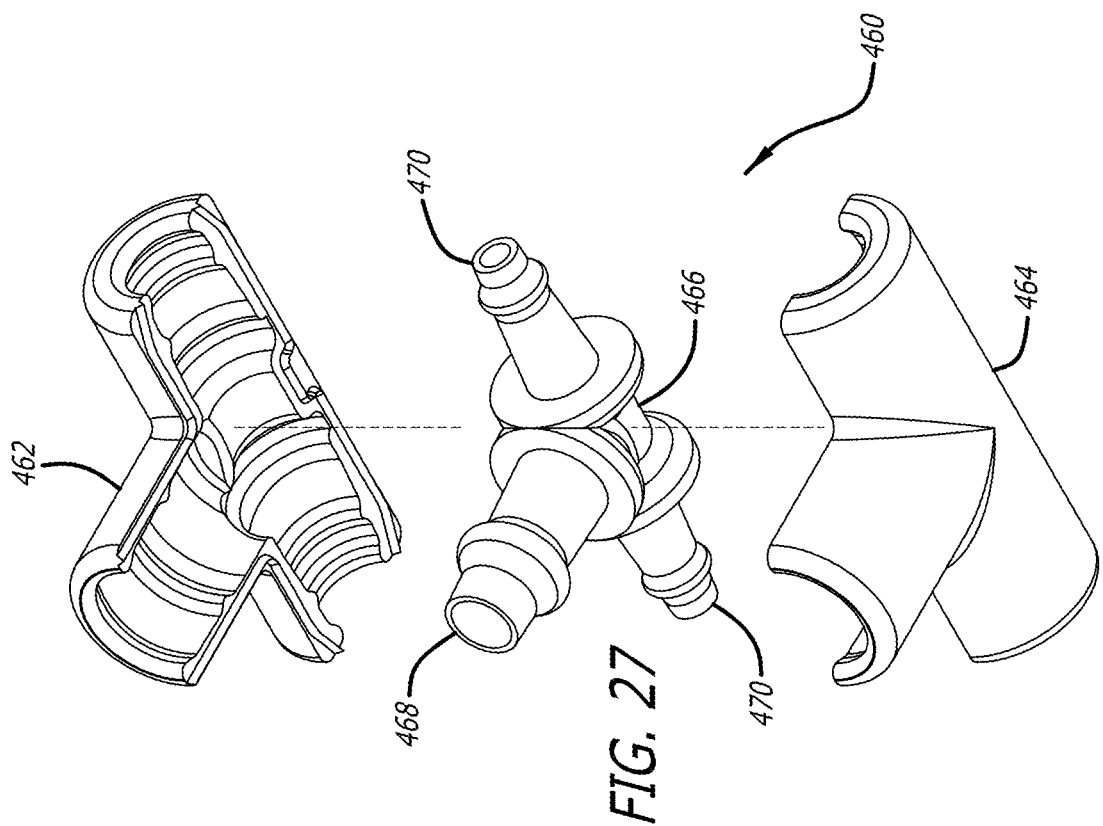

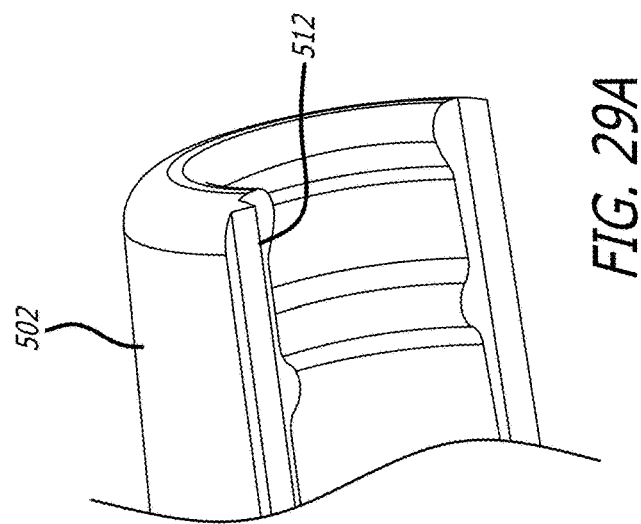
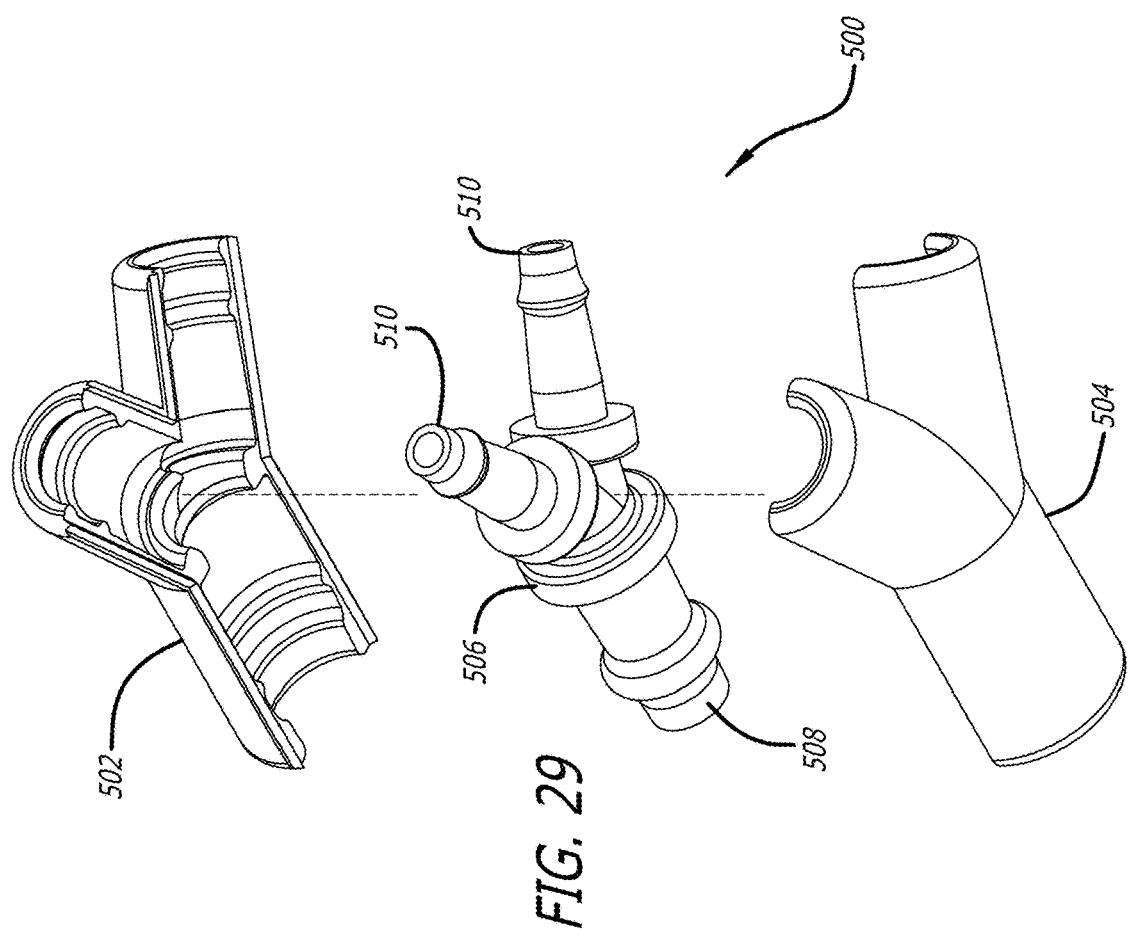

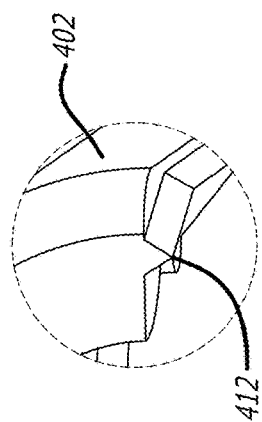
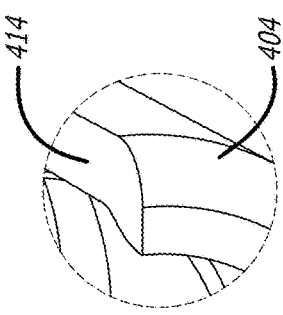
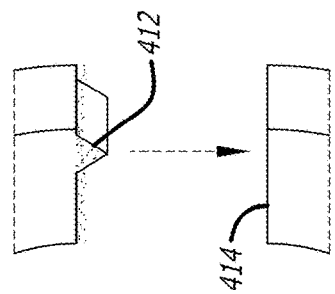
FIG. 31A
FIG. 31B
FIG. 32
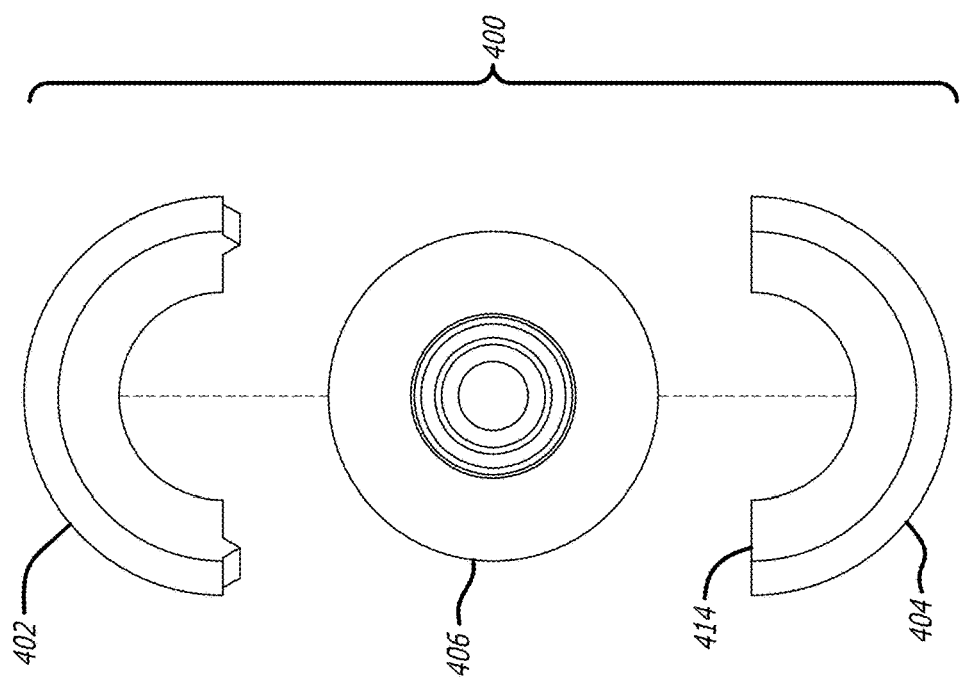
FIG. 30

FLUID DISTRIBUTION JUNCTIONS AND ASSEMBLY METHODS

RELATED APPLICATION INFORMATION

This application is a continuation of U.S. patent application Ser. No. 18/661,592, filed May 11, 2024, now issued as U.S. Pat. No. 12,111,002, which claims the benefit of U.S. Patent Application No. 63/501,760, filed May 12, 2023, the entire disclosure of which are all incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to fluid distribution junctions and methods of assembly therefor and, more particularly, to methods of pre-assembling junctions with tubular conduits.

Description of the Related Art

Processing of fluids in chemical and biological reactors often results in valuable fluid product which must be distributed to various receptacles for further processing, delivery to customers or sampling. Current junctions for distribution of fluids from one place to one or more others are inefficient to assemble.

Current systems make use of linear manifolds leading from a source of fluid to which cross and tee junctions are connected. Fluid enters from one end of the manifold and flows in a linear fashion over each cross or tee branch along the header of the manifold. When liquid flows in this manner, it takes the path of least resistance, and since most of the branches (drops) are smaller in diameter than the manifold header, they receive liquid until hydraulic pressure builds to the point of pressure equalization. Moreover, assembling a large fluid distribution system with conduits leading to various destinations is time-consuming and prone to error.

There is a need for fluid distribution junctions and methods of assembly for distribution of fluid between various locations.

SUMMARY OF THE INVENTION

The present application discloses a fluid distribution junctions for distributing fluid between various locations and methods of assembly. Flexible conduits connect to the junctions, and a consumable subsystem of the junction, conduits and receptacle caps or other connectors may be pre-assembled for ease of use. A subassembly is formed by coupling a plurality of flexible tubular conduits to a plurality of fluid connectors of a fluid junction, the fluid junction having an inner fluid plenum chamber leading to the fluid connectors. Two shells are sandwiched on opposite sides of the subassembly, the shells having mating concave receiving surfaces that together conform around each of the fluid connectors and clamp the tubular conduits onto the circular beads. Juxtaposed joint surfaces on each pair of mating concave receiving surfaces are bonded together such as with sonic welding to make the fluid distribution junction assembly.

The application discloses a method for forming the pre-assembled fluid junction and flexible conduits. One of the junctions having flexible tubular conduits pressed onto fluid connectors is sandwiched between two of the bonding shells. The sandwiched stack is then placed between a base and an ultrasonic vibration horn. When the ultrasonic energy is applied by the horn, the bonding shells melt at their joint surfaces and secure the flexible conduits to the fluid connectors. Energy directors or concentrators such as narrow features along the joint surfaces of one of the shells facilitates rapid melting and good and reliable coupling of the shells.

One fluid distribution system that utilizes the improved junction has a distribution manifold with a single inlet and a plurality of outlets arrayed around a circumferential outer periphery. The outlets may be directed to the different receptacles which each have their own vent filter, or each receptacle connects back to the distribution manifold for common venting. The system is especially useful for distributing fluid products from chemical or biological reactors while assuring an integrally closed system.

DESCRIPTION OF THE DRAWINGS

FIG. 14 is an exploded perspective view of the fluid distribution and vent manifold assembly including shells that sandwich together the fluid distribution and vent manifold along with inlet and outlet connectors;

FIG. 15 is an exploded elevational view of the fluid distribution and vent manifold assembly;

FIGS. 16A and 16B are elevational views of the fluid distribution and vent manifold assembly in slightly different rotational positions;

FIG. 24 is an exploded perspective view of a reducing straight junction flanked by two bonding shells for connecting the junction with flexible tubes, and FIG. 24A is an enlargement of one of the shells showing an ultrasonic concentrator rib;

FIG. 25 is an exploded perspective view of an elbow junction flanked by two bonding shells for connecting the junction with flexible tubes, and FIG. 25A is an enlargement of one of the shells showing an ultrasonic concentrator rib;

FIG. 27 is an exploded perspective view of a reducing T-junction flanked by two bonding shells for connecting the junction with flexible tubes, and FIG. 27A is an enlargement of one of the shells showing an ultrasonic concentrator rib;

FIG. 29 is an exploded perspective view of a reducing Y-junction flanked by two bonding shells for connecting the junction with flexible tubes, and FIG. 29A is an enlargement of one of the shells showing an ultrasonic concentrator rib;

FIG. 30 is an exploded elevational end view of the reducing straight junction and shell assembly of FIG. 24;

FIG. 31A is an enlargement of an edge one of the shells showing an ultrasonic concentrator rib from the end, and FIG. 31B is an enlargement of an edge of the other one of the shells having a flat contact surface;

FIG. 32 is a schematic view of the presumed melt pattern that occurs when the two shells of FIGS. 31A and 31B are joined together using ultrasonic energy.

DETAILED DESCRIPTION

Figure 1:
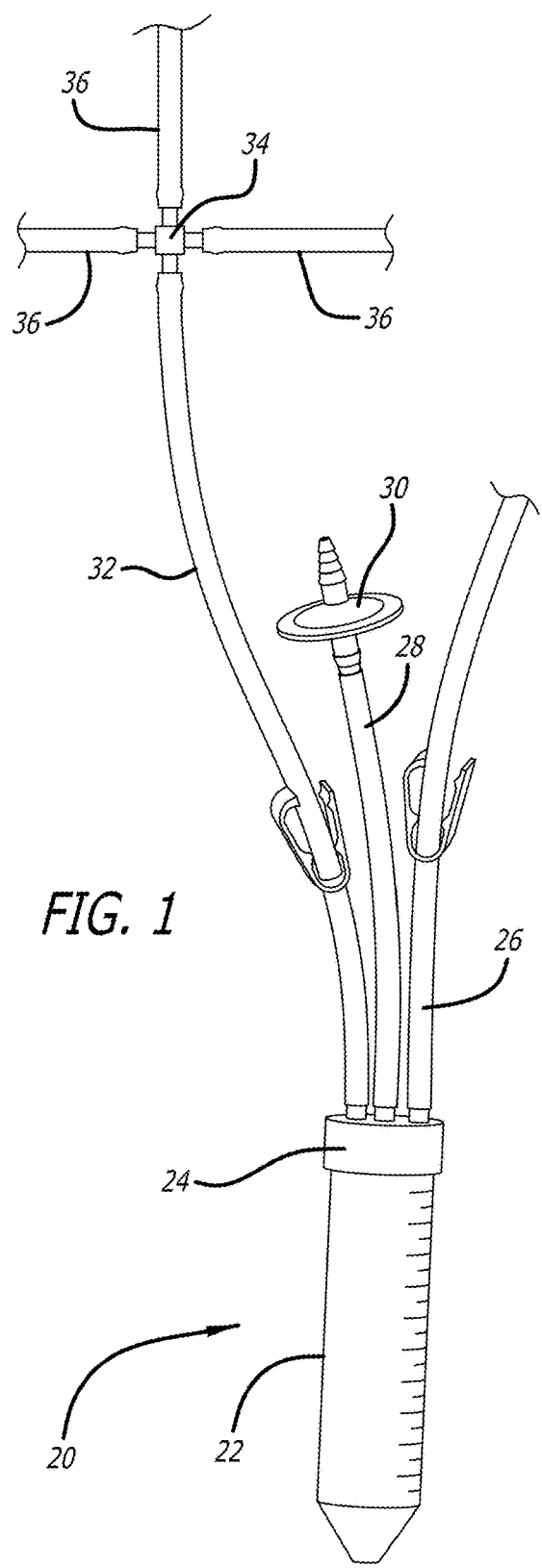
FIG. 1 is a schematic view of a sampling receptacle having a number of flexible conduits extending from a cap thereof, one of which couples to a prior art 4-way junction with additional flexible conduits connected on all three outlets.

Referring now to FIG. 1, an exemplary fluid distribution system 20 is illustrated for collecting fluid from a source and distributing the fluid to other locations. It should be understood that the illustrated system 20 is just one example, and the concepts disclosed herein can be modified for different systems.

Figure 2:
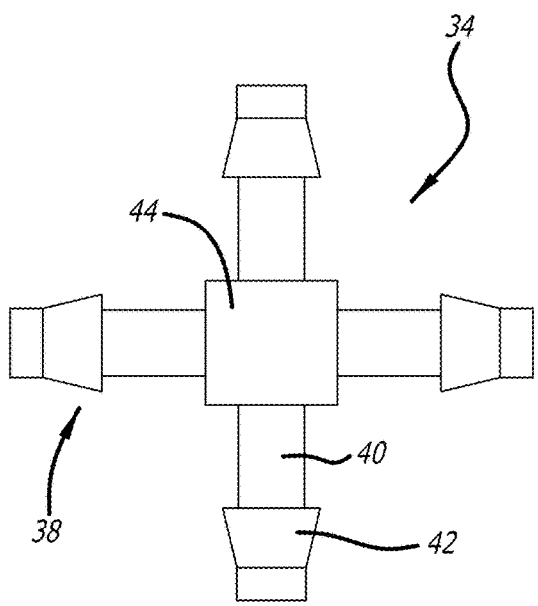
FIG. 2 is an elevational view of the prior art 4-way junction showing barbs for connecting to the flexible conduits.

The system 20 comprises a flask or receptacle 22 having a cap 24 and a plurality of flexible conduits connected thereto. An inlet conduit 26 supplies fluid from a source (not shown) into the hollow receptacle 22. A second conduit 28 may be connected to the cap 24 and provided with a vent filter 30. Gases which may build up within the receptacle 22 can then be safely vented. The fluid distribution system 20 is especially useful for dividing fluid flow from a larger vessel into smaller individual receptacles 22, such as the flask shown. For instance, a third conduit 32 extends from the cap 24 to a conventional 4-way junction 34, which is shown isolated in FIG. 2. The 4-way junction 34 distributes the fluid removed from the receptacle 22 to different destinations via three flexible conduits 36.

The conduit 32 leading from the receptacle 22 and the additional three flexible conduits 36 attach to the barbed fittings 38 provided by the junction 34. The 4-way junction 34 and others of its kind are standard components of conventional fluid distribution systems. In the illustrated example, the barbed fittings 38 include a short length of rigid tubing 40 having a frusto-conical outward bead 42 (often referred to as a barb or barbed bead) which gets wider towards a central housing 44 in which is located a plenum chamber joining the inner lumens of all four fittings. The junction 34 is typically molded of a rigid plastic such as polypropylene, and the flexible conduits 32, 36 are a thermoplastic elastomer (TPE), silicone or the like that can be pressed onto each fitting 38. The inner diameter of the conduits 32, 36 are approximately the same as the diameter of the rigid tubing 40 such that the conduits flex and slide over the tapered ramp provided by the outward beads 42 to the central housing 44. The sharp step provided on the inner end of the outward beads 42 then impedes removal of the conduits 32, 36. The single barb provided by the outward beads 42 can be replaced with a series of such beads in alternative junction configurations.

The arrangement of the 4-way junction 34 with attached flexible conduits 32, 36 is extremely common in the chemical and biological processing field, and is typically done at the time of setting up the particular process. Often, this same setup is duplicated many times over for a single process, and the task of connecting all of the flexible conduits to all of the junctions can be time-consuming and thus costly. Moreover, pressing the conduits 32, 36 onto the barbed fittings 38 can require significant force, which over time may manifest as injuries such as carpal tunnel syndrome for the workers.

Finally, having to assemble every one of the separate conduits to such barbed fittings introduces the potential of contamination to sometimes extremely sensitive chemical or biological processing. There is a need for a better system for connecting the flexible conduits to such junctions.

Figure 3:
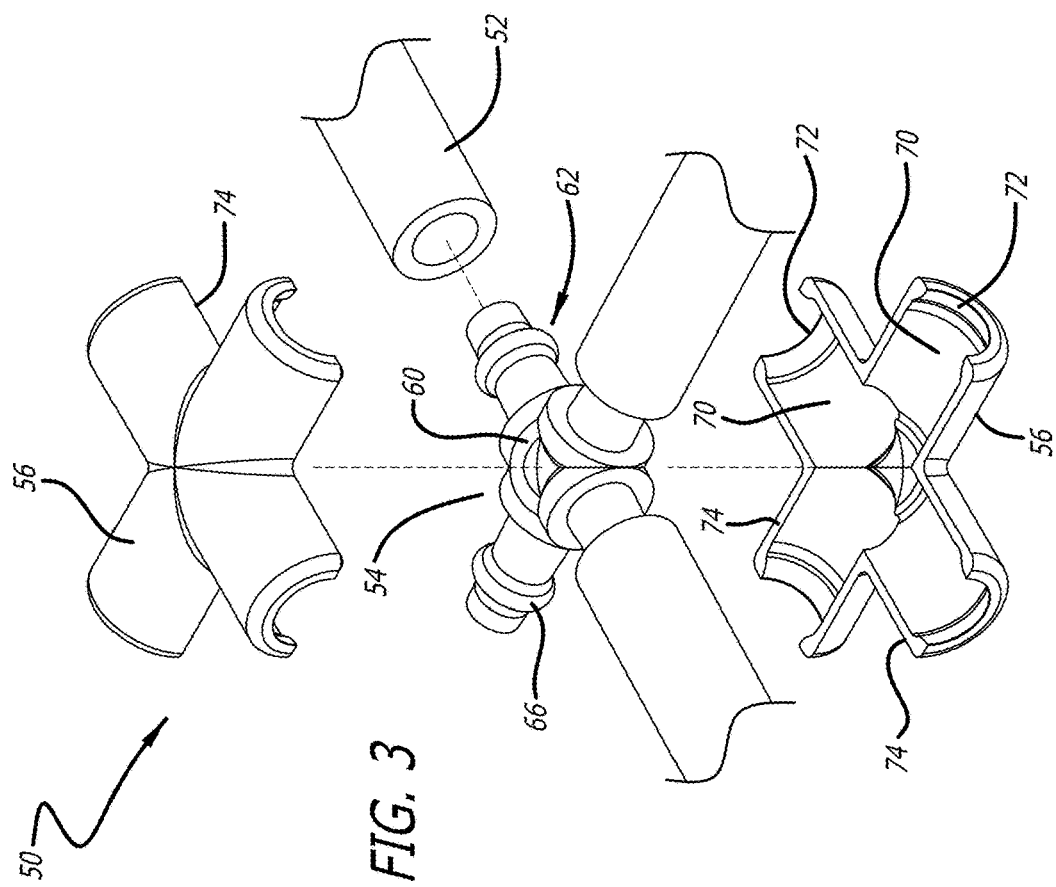
FIG. 3 is an exploded perspective view of a 4-way junction assembly of the present application in the process of being integrated with flexible conduits.

In one solution, FIG. 3 is an exploded perspective view of a 4-way junction assembly 50 of the present application in the process of being integrated with flexible conduits 52. The junction assembly 50 comprises three components: an inner 4-way junction 54 and two outer covers or shells 56. The 4-way junction 54 is constructed much like the 4-way junction 34 of the prior art shown and described above, with a central housing 60 having four tubular fittings 62 extending outward therefrom in a cross pattern. As before, the central housing 60 defines a central plenum chamber that communicates equally with lumens 64 of each of the tubular fittings 62. Rather than a frusto-conical bead, each one of the fittings 62 has an outwardly projecting circular bead 66 having a somewhat semi-circular cross-section. As will be shown, the assembly of the 4-way junction 54 with the two outer shells 56 provides enough friction to hold the flexible conduits 52 in place on the fittings 62. As before, the junction 54 is typically molded of a rigid plastic such as polypropylene, and the flexible conduits 52 are a thermoplastic elastomer (TPE), silicone or the like that can be pressed onto each fitting 62. The outer shells 56 are also molded of a rigid plastic such as polypropylene.

FIG. 3 shows two of the flexible conduits 52 mounted over associated tubular fittings 62, with a third fitting in the process of receiving a flexible conduit, and the fourth fitting having no conduit. This represents a step in putting the junction assembly 50 together. The sequence involves first pre-assembling the flexible conduits 52 onto the tubular fittings 62 of the junction 54, and then sandwiching that sub-assembly with the outer shells 56. Each of the outer shells 56 has a cross-pattern of inwardly concave walls that fit closely around the sub-assembly of the conduits 52 and junction 54. More specifically, each of the four legs of the outer shells 56 has a concave semi-cylindrical inner wall portion 70 with a semi-circular inward rib 72 provided on a radially outward extent thereof. A diameter of the semi-cylindrical inner wall portions 70 preferably matches an outside diameter of the flexible conduits 52. When the two shells 56 are closed around the sub-assembly of the conduits 52 and junction 54, the inner wall portions 70 compress the flexible conduits 52 against the circular beads 66 of the tubular fittings 62. Moreover, the semi-circular inward rib 72 compress inwardly against the flexible conduits 52. This combination of compression from the outer shells 56 effectively holds the flexible conduits 52 in place.

FIG. 3 shows that each of the shells 56 has a planar joint surface 74 that matches up with the joint surface of the other shell. The joint surfaces 74 extend along the edges of the concave inner wall portions 70, and are thus arranged in a cross pattern as well. Juxtaposition of these joint surfaces 74 of both shells 56 enables them to be bonded together. The bonding can be done in a number of ways, including adhesives, fusion or electro-fusion welding, and sonic welding. The present application contemplates an assembly process that utilizes sonic welding to avoid the use of chemical adhesives.

Figure 4:
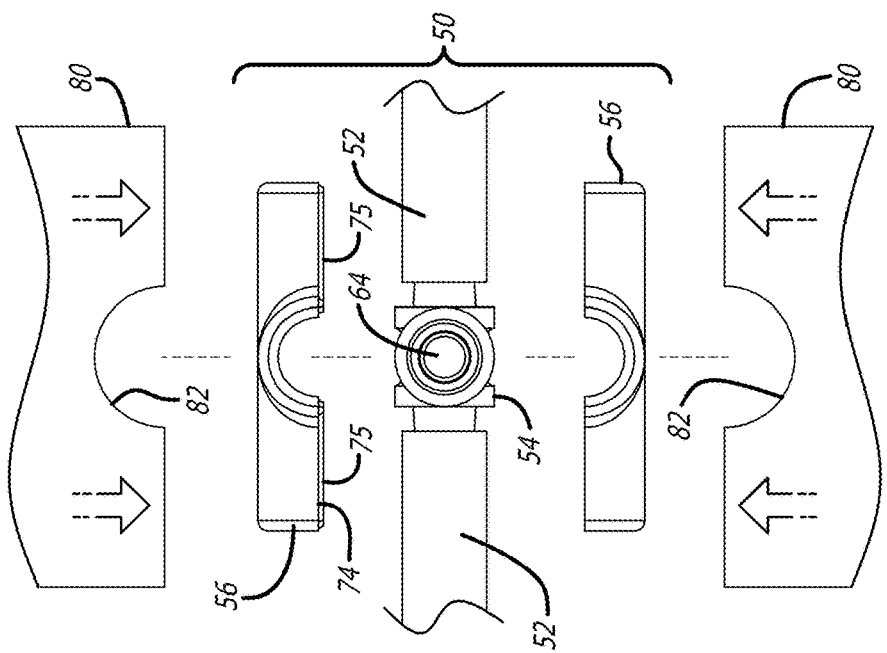
FIG. 4 is an exploded elevational view of the 4-way junction assembly integrated with flexible conduits in a process of pressing and bonding the components together.

FIG. 4 is an exploded elevational view of the 4-way junction 54 integrated with flexible conduits 52 in a process of pressing and bonding the frames or shells 56 together. The components of the 4-way junction assembly 50 are stacked as seen. Opposing presses 80 are used to compress this stacked assembly of components together, applying pressure and vibration or heat/current to fuse the contacting components. The opposing presses 80 have pressing surfaces that mate closely with the stacked shells 56, such as having a cross pattern of recesses 82. A preferred method for fusing is sonic welding, though thermal or electro-thermal welding may be used as an alternate or accompanying method.

Sonic welding, also known as ultrasonic welding, is a technique used to join thermoplastic materials together, and is widely used in various industries, including automotive, electronics, medical, and packaging. The process utilizes high-frequency mechanical vibrations to create frictional heat at the interface of the plastic parts, causing them to melt and fuse together.

Sonic welding involves first preparing plastic parts to be joined by ensuring that their surfaces are clean and free from contaminants. Any protective coatings, films, or adhesives are removed from the joining areas. The plastic parts are positioned between the opposing presses 80, which are designed to hold them securely during the welding process. The two presses 80 consist of a stationary anvil and a movable horn (also called an ultrasonic stack) that applies the ultrasonic vibrations to the parts. The opposing presses 80 applying a consistent pressure to ensure proper mating of the surfaces of the plastic parts into contact with each other (i.e., joints), in this case the juxtaposed joint surfaces 74 of the stacked outer shells 56, as seen in FIG. 3. The amount of pressure applied depends on the specific materials and their thickness. Narrowed physical aspects or ultrasonic energy directors may be used to focus or concentrate the ultrasonic energy in a smaller region for faster heating. For instance, FIG. 4 shows narrow ribs 75 visible below the joint surface 74 of the upper one of the stacked shells 56. These narrow ribs 75 contact the colinear and planar joint surfaces 74 on the lower one of the stacked shells 56 and direct the energy along more of a line as opposed to an area for faster heating and melting. A rigid plastic such as polypropylene used for the stacked shells 56 quickly melts and provides a solid joint. Particular arrangements of such ultrasonic energy directors will be shown and described later.

The horn part of the opposing presses 80 transmits high-frequency ultrasonic vibrations (typically in the range of 20 kHz to 70 kHz) to the joint interface between the plastic parts. The vibrations are generated by a transducer, which converts electrical energy into mechanical vibrations. Consequently, the ultrasonic vibrations create rapid back-and-forth movements at the joint interfaces, causing frictional heat to build up between the plastic surfaces. This localized heat softens the plastic material, melting it at the contact points. As the plastic materials reach their melting points, the pressure applied to the joint forces the melted material to flow and interdiffuse, creating molecular bonds between the parts. Once the vibrations stop, the melted plastic resolidifies, forming a strong and durable bond.

After the ultrasonic vibrations cease, the joint is allowed to cool down. The cooling time depends on the specific plastic material and the size of the welded part. Cooling can be accelerated by methods such as air or water cooling. Once the joints have cooled and solidified, the welding process is considered complete. The welded parts can be inspected for any defects, such as incomplete fusion, voids, or flash. Additional trimming or post-weld processing may be required depending on the specific application.

By utilizing the method represented in FIG. 4, the conduits 52 can be rapidly pre-assembled with the 4-way junction 54 for subsequent connection within the fluid distribution system 20 of FIG. 1, for example. If a given chemical or biological process is known to require a particular number of junctions attached to flexible conduits, these can be procured pre-assembled from the manufacturer and simply plugged into the particular process arrangement. The pre-assembly has a significant advantage in that it arrives sterile in sterile packaging, and there is no need to separately connect conduits to junctions, which can result in contamination. Moreover, the pre-assembled conduits 52 and 4-way junction 54 can be further joined by the manufacturer to components, such as the cap 24 of the receptacle 22, for even easier assembly and the laboratory or process facility. Saving time, money, and potentially injurious repetitive assembly steps is a significant advantage.

Figure 5:
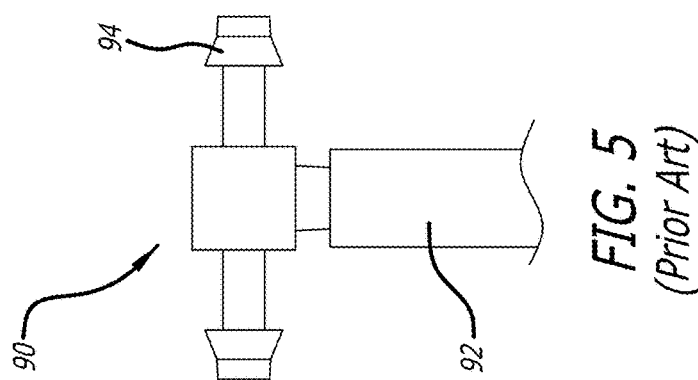
FIG. 5 is a barbed T-junction of the prior art with one flexible conduit connected thereto.

Another such arrangement is shown in FIG. 5, where a barbed T-junction 90 of the prior art with one flexible conduit 92 connected thereto is shown. Once again, the barbed T-junction 90 has frusto-conical beads or barbs 94 over which the flexible conduits 92 are pressed. Each barbed T-junction 90 thus requires three separate steps of attaching the conduits 92, potentially introducing contamination and requiring time and thus money.

Figure 7:
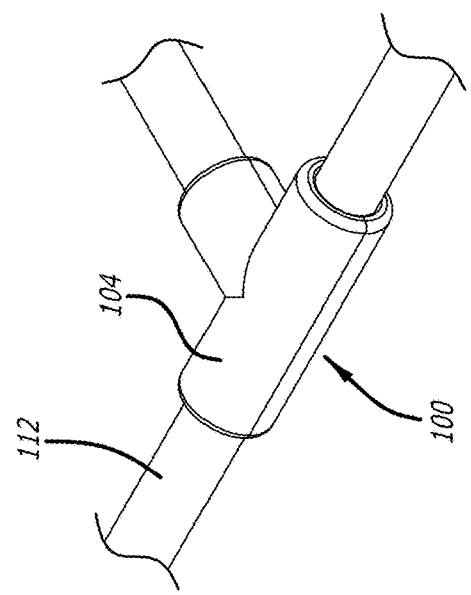
FIG. 7 is an assembled perspective view of the T-junction of FIG. 6 integrated with three flexible conduits.
Figure 6:
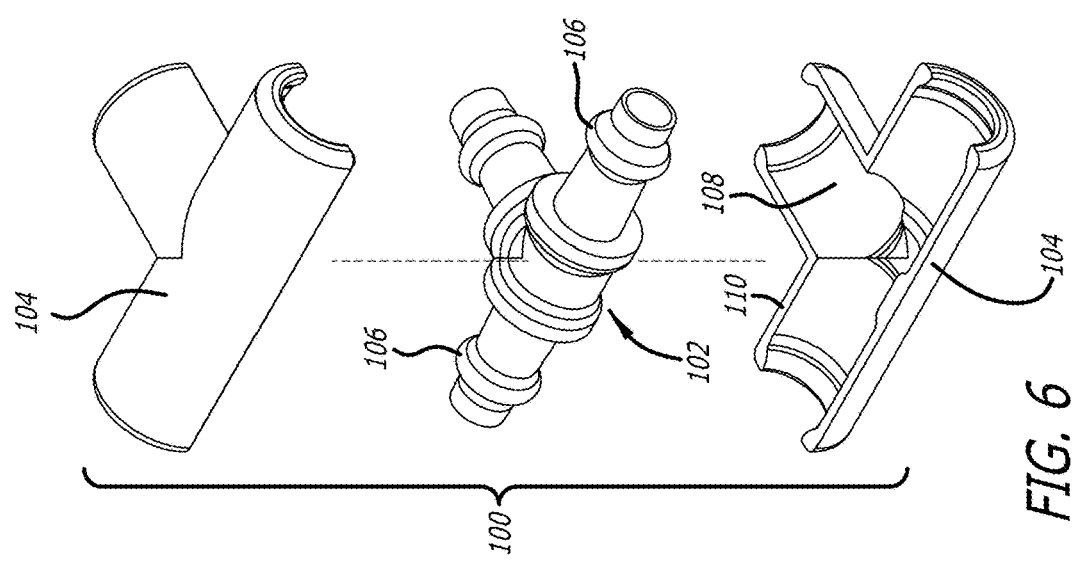
FIG. 6 is an exploded perspective view of a T-junction of the present application.

FIG. 6 is an exploded perspective view of an equivalent T-junction assembly 100 of the present application comprising an inner T-junction 102 sandwiched between two outer covers or shells 104. The T-junction 102 has three legs or fittings with barbs or beads 106, as described above with respect to the 4-way junction 54. Likewise, the outer shells 104 have concave inner surfaces 108 that mate together along planar joint surfaces 110. Flexible conduits 112 are first integrated with the inner T-junction 102, and then that sub-assembly is sandwiched between the two outer shells 104 which are bonded together, as seen in FIG. 7. Once again sonic welding is the preferred method of bonding.

Figure 8:
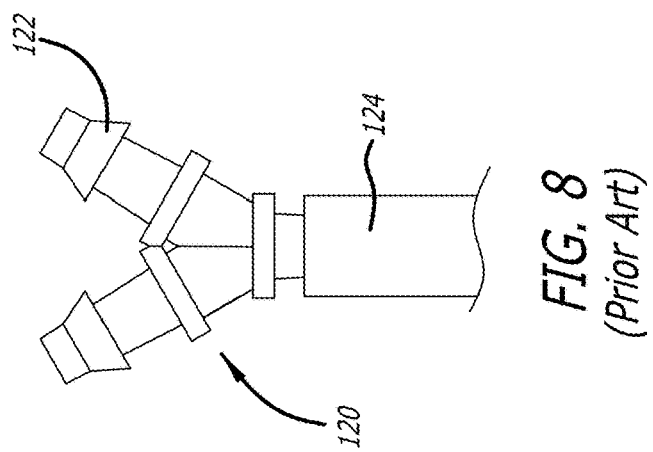
FIG. 8 is a barbed Y-junction of the prior art with one flexible conduit connected thereto.

FIG. 8 is a barbed Y-junction 120 of the prior art with one flexible conduit 122 connected thereto. Once again, the barbed Y-junction 120 has frusto-conical beads or barbs 124 over which the flexible conduits 122 are pressed. Each barbed Y-junction 120 thus requires three separate steps of attaching the conduits 122, potentially introducing contamination and requiring time and thus money.

Figure 10:
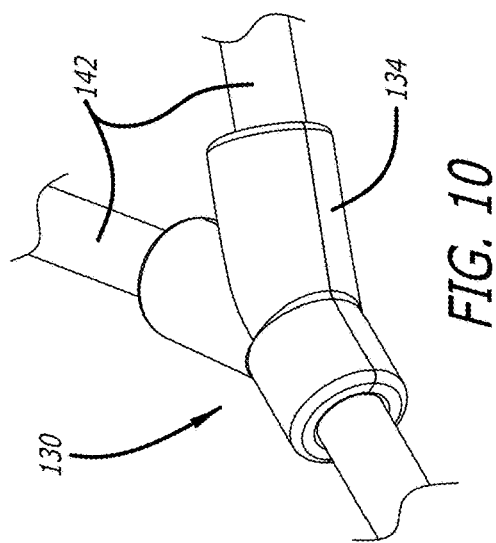
FIG. 10 is an assembled perspective view of the Y-junction of FIG. 9 integrated with three flexible conduits.
Figure 9:
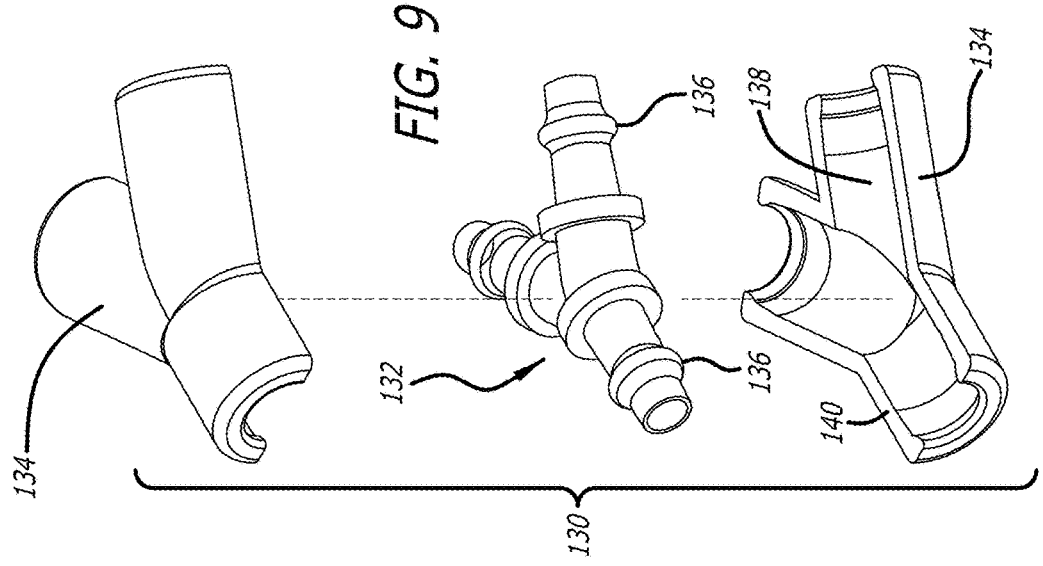
FIG. 9 is an exploded perspective view of a Y-junction of the present application.

FIG. 9 is an exploded perspective view of an equivalent Y-junction assembly 130 of the present application comprising an inner Y-junction 132 sandwiched between two outer covers or shells 134. The Y-junction 132 has three legs or fittings with barbs or beads 136, as described above with respect to the 4-way junction 54. Likewise, the outer shells 134 have concave inner surfaces 138 that mate together along planar joint surfaces 140. Flexible conduits 142 are first integrated with the inner T-junction 132, and then that sub-assembly is sandwiched between the two outer shells 134 which are bonded together, as seen in FIG. 10. Once again sonic welding is the preferred method of bonding.

Figure 11:
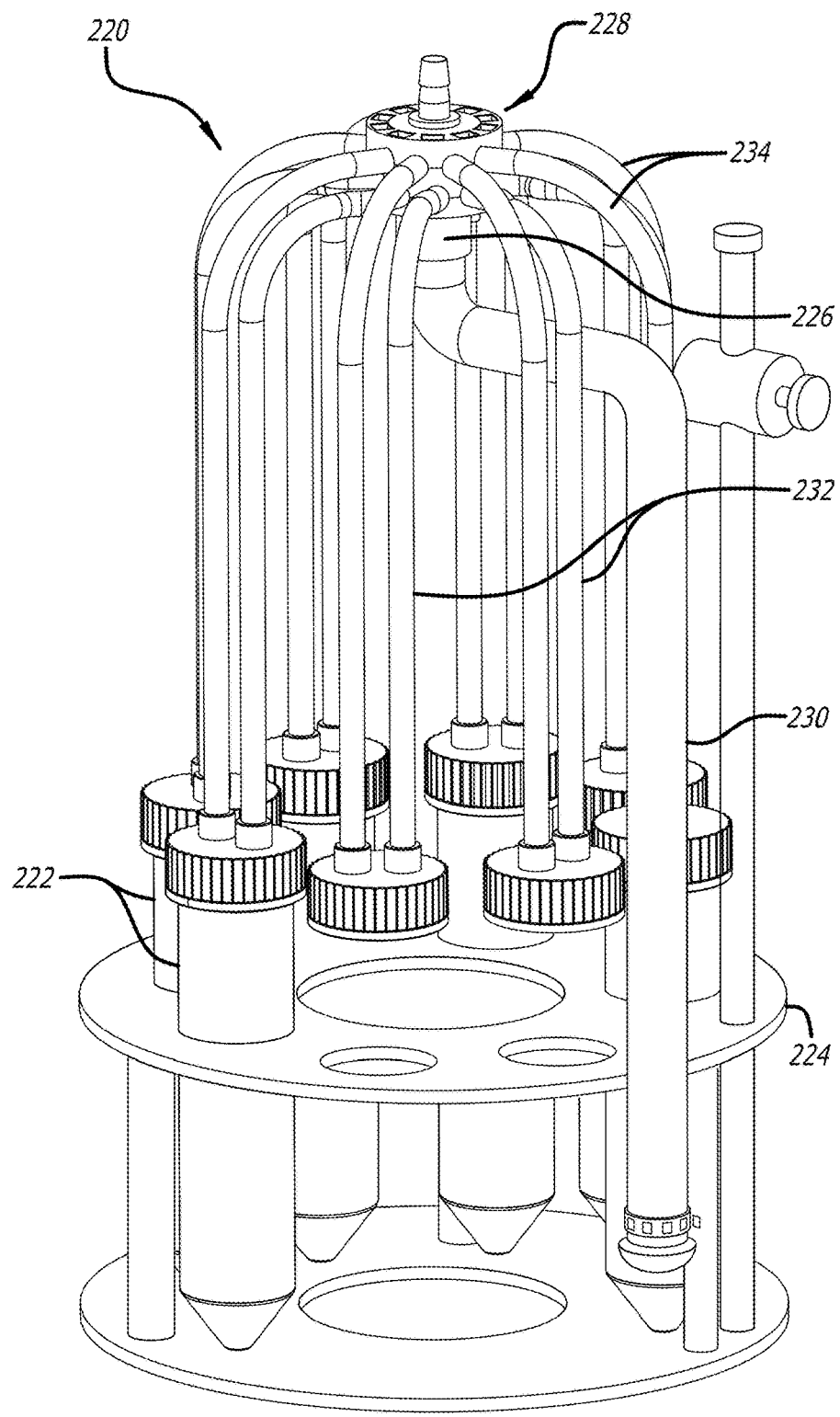
FIG. 11 is a perspective view of an alternative fluid distribution system for quickly filling eight smaller receptacles from a single source, all supported by a support stand.

FIG. 11 is a perspective view of more complex alternative fluid distribution system 220 for quickly filling eight receptacles 222 from a single source, all supported by a support stand 224. The alternative fluid distribution system 220 includes a lower inlet 226 leading to a fluid distribution and vent manifold assembly 228 that separates an inlet fluid flow for delivery to eight individual receptacles 222, all supported by the support stand 224. Although not shown, a source for the inlet flow may comprise a larger vessel, such as a bioreactor vessel or other such chemical processing equipment. The fluid distribution system 220 is especially useful for dividing fluid flow from such a larger vessel into smaller individual receptacles 222, such as the flasks shown. The lower inlet 226 of the manifold assembly 228 located on its underside connects to a larger inlet pipe 230.

Figure 12:
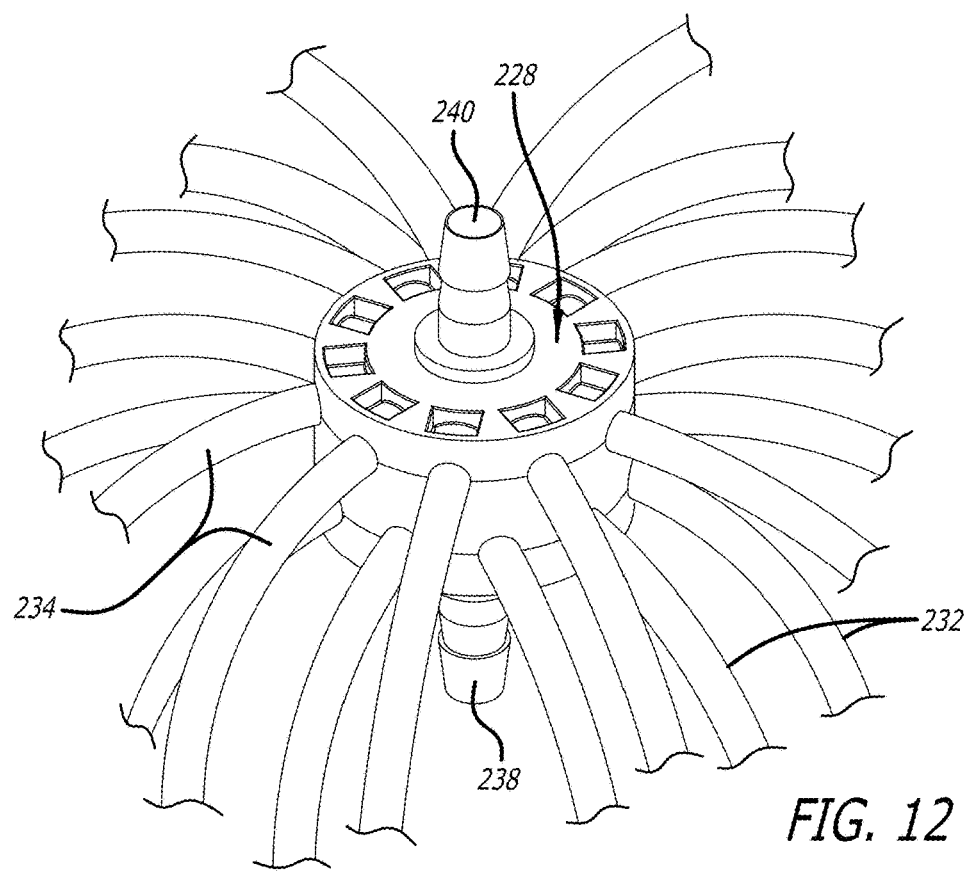
FIG. 12 is an enlarged perspective view of the alternative fluid distribution and vent manifold assembly for the fluid distribution system with inlet and outlet conduits coupled thereto.
Figure 13:
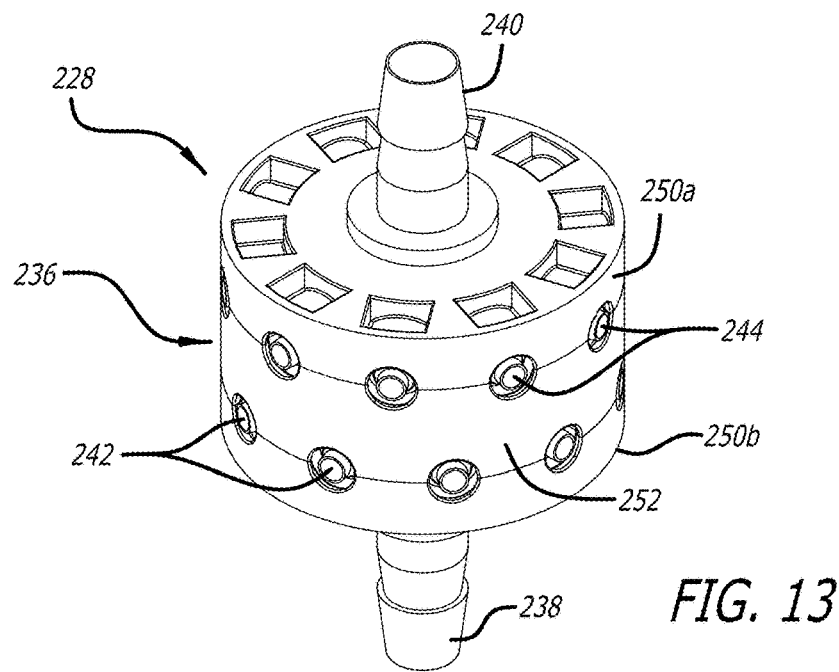
FIG. 13 shows the fluid distribution and vent manifold assembly with the inlet and outlet conduits removed.

Fluid distribution and vent manifold assembly 228 is seen in the enlarged perspective and elevational views of FIGS. 12 and 13. Namely, FIG. 12 is an enlarged perspective view of the manifold assembly 228 with eight fluid outlet and inlet tubes or conduits 232, 234 coupled thereto, and FIG. 13 shows the manifold assembly with the conduits removed. The manifold assembly 228 comprises a compact cylindrical frame 236 and a central inlet connector 238 projects below the cylindrical frame 236 and central outlet connector 240 projects upward. The manifold assembly 228 includes a plurality of lower outlet fittings 242 that couple to the outlet conduits 232, and a plurality of upper inlet fittings 244 are coupled to the inlet conduits 234. The fluid conduits 232, 234 may be fused, bonded or otherwise fixed to the outlet fittings 242 and inlet fittings 244 which are recessed within the cylindrical manifold assembly 228, as described below.

As illustrated, there are eight outlet fittings 242 and outlet conduits 232 distributed evenly (45° increments) around the circumference of the cylindrical manifold assembly 228. Likewise, there are shown eight inlet fittings 244 and inlet conduits 234 distributed evenly (45° increments) around the circumference of the cylindrical manifold assembly 228. As will be explained below, primary internal channels within the manifold assembly 228 direct fluid flowing in through the inlet connector 238 evenly outward through the outlet fittings 242 and fluid outlet conduits 232. When configured to provide a common vent, secondary internal channels within the manifold assembly 228 direct fluid flowing in through the inlet conduits 234 and inlet fittings 244 evenly inward to a central plenum and central outlet connector 240 to be vented upward.

With reference now to the exploded view of FIG. 14, the components of the fluid distribution and vent manifold assembly 228 can be better explained. The generally cylindrical frame 236 seen in FIG. 13 is formed by three disk-shaped members coupled together. Namely, upper and lower shells 250a, 250b sandwich a central shell 252 therebetween. The shells 250, 252 contain and conceal a pair of fluid distribution junctions or manifolds 254, 256. More particularly, as seen by the exploded elevational view of FIG. 15, a lower fluid distribution manifold 254 is positioned between the lower shell 250b and the central shell 252, and an upper vent distribution manifold 256 is positioned between the upper shell 250a and the central shell 252. The fluid distribution manifold 254 has the radially oriented outlet fittings 242, and the vent distribution manifold 256 has the radially oriented inlet fittings 244. The radially-projecting outlet and inlet fittings 242, 244 are recessed within the shells 250, 252 that axially sandwich the fluid distribution manifold 254 and vent distribution manifold 256 and define the outer compact cylindrical shape. Each manifold 254, 256 has at least four outlet and inlet fittings 242, 244, respectively, but preferably eight as shown.

The terms "junction" and "manifold" are used herein to refer to single-piece members that have a number of fluid inlet and outlet connectors or fittings for distributing fluid between locations, such as in the manifolds 254, 256. "Fluid" in this sense means liquid or gas. The term "junction" is conventionally used to describe the T-, Y-, and 4-way junctions (and others not mentioned) with inner channels that intersect within the junction, while a manifold is more accurate when discussing a member which has one channel or port opening to an inner plenum chamber which communicates with two or more other ports. In this sense, a manifold is a more complex subset of a junction, and the term "junction" encompasses both devices.

Figure 18A:
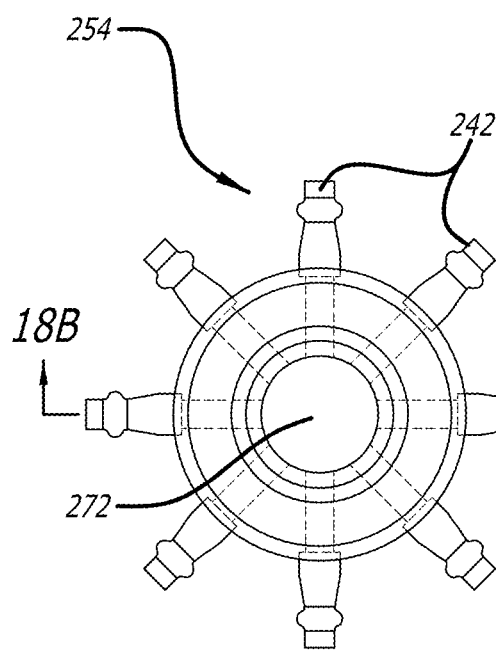
FIG. 18A is a bottom plan view of a fluid distribution manifold portion of the assembly of FIG. 15.
Figure 18B:
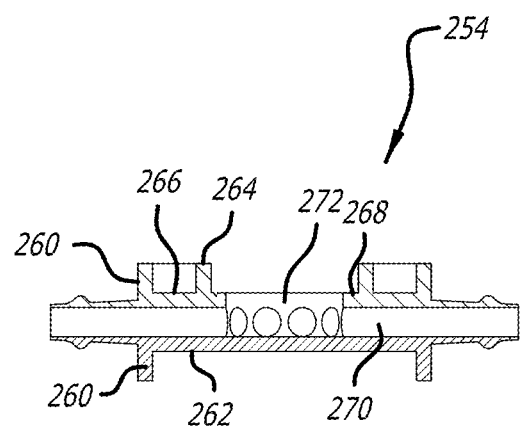
FIG. 18B is a radial sectional view through the fluid distribution manifold taken along the section line in FIG. 18A.

The fluid distribution manifold 254 and the vent distribution manifold 256 are preferably identical, and simply inverted vertically with respect to one another, and thus will be described together with like elements being given like reference numbers. As seen in FIG. 14, as well as with reference to FIGS. 18A and 18B, the fluid distribution manifold 254 has a cylindrical outer wall 260 from which the outlet fittings 242 project radially outward. A solid radially-oriented plenum floor 262 extends across the manifold 254 within and is stepped axially downward from an upper edge of the cylindrical outer wall 260. The remaining features of the fluid distribution manifold 254 are also seen in the top view of the vent distribution manifold 256 in FIG. 14, as the two manifolds are identical.

The cylindrical outer wall 260 circumscribes a smaller inner circular wall 264 with a radially-oriented inner bulkhead 266 extending therebetween. The inner circular wall 264 extends axially until interrupted by a stepped cylindrical plenum chamber wall 268 through which a plurality of radial passages 270 open to a central plenum chamber 272. The radial passages 270 extend outward through the inlet fittings 244 of the vent distribution manifold 256 (or the outlet fittings 242 of the fluid distribution manifold 254). FIGS. 16A and 16B are elevational views of the fluid distribution and vent manifold assembly 228 in slightly different rotational positions. As mentioned, the various components seen in FIG. 15 are combined into the compact cylindrical frame 236 with the inlet connector 238 projecting downward, and the outlet connector 240 projecting upward therefrom. The circular array of outlet fittings 242 are seen below the circular array of inlet fittings 244.

Figure 17A:
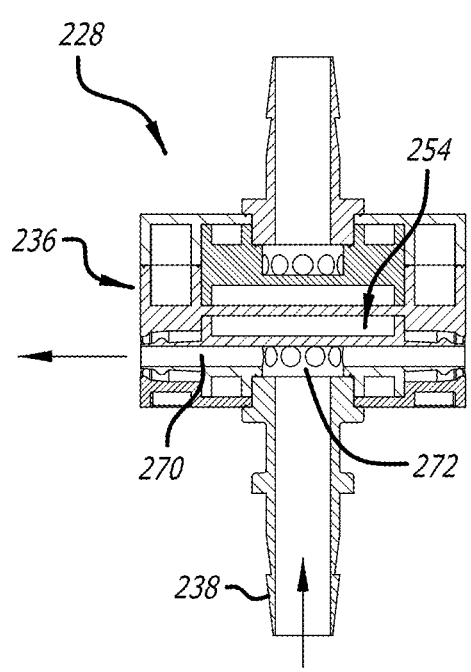
FIGS. 17A and 17B are axial sectional views through the fluid distribution and vent manifold assembly taken along the respective section lines in FIGS. 16A and 16B.
Figure 17B:
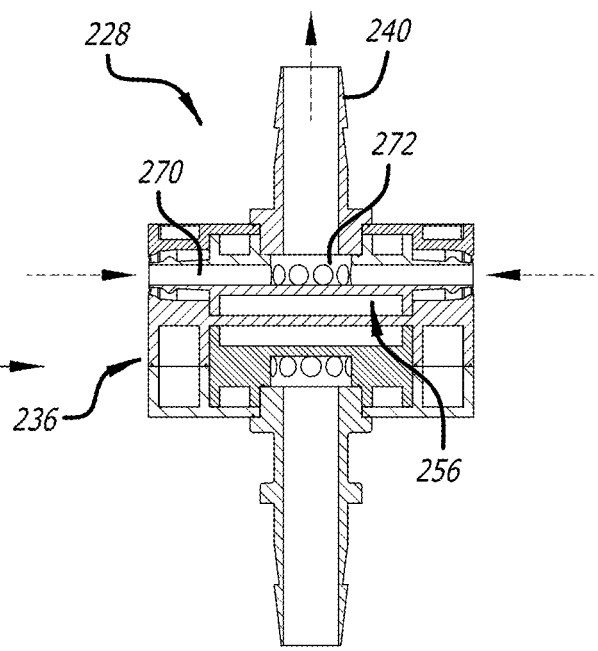

FIGS. 17A and 17B are axial sectional views through the fluid distribution and vent manifold assembly 228 taken along the respective section lines in FIGS. 16A and 16B. By virtue of the slightly different rotational orientation of FIGS. 16A and 16B, fluid and gasses flowing through the manifold assembly 228 can be seen. The inlet connector 238 and the outlet connector 240 both have stepped ends that engage the respective manifolds 254, 256 and open to respective central plenum chambers 272. Namely, the innermost end of each connector 238, 240 fits closely within the circular walls 264 and abuts the stepped cylindrical plenum chamber wall 268. Outward flanges on each connector 238, 240 contact outer faces of respective shells 250a, 250b, best seen in FIGS. 13 and 16A/16B. Fluid or gasses thus flow directly to or from the plenum chambers 272 and through the connectors 238, 240.

First off, FIG. 16A is a section through one of the radial passages 270 in the fluid distribution manifold 254. Fluid introduced into the inlet connector 238 travels upward into the central plenum chamber 272 and is then evenly distributed outward through the radial passages 270, as indicated in FIG. 17A. FIGS. 11 and 12 show the subsequent connection of the outlet conduits 232 to the outlet fittings 242, eventually leading to the fluid vessels or receptacles 222 held in the stand 224. Each receptacle 222 has a closure or cap 222a with an opening with which the outlet conduits 232 communicate. The cap 222a has a second opening with which the inlet conduits 234 communicate. The inlet conduits 234 extend upward and couple with the inlet fittings 244 of the manifold assembly 228.

Accordingly, FIG. 16B is a section through one of the radial passages 270 in the vent distribution manifold 256. Gases which are displaced from the receptacles 222 upon filling with liquid are vented upward through the conduits 234, through the inlet fittings 244 and into the radial passages 270 in the vent distribution manifold 256, as indicated in FIG. 17B. The gases flow inward to the central plenum chamber 272, and from there turn upward to exit through the outlet connector 240. Although not shown in FIG. 11, one or more common vent filter(s) may be attached to the outlet connector 240, such as shown at 60 in FIGS. 1 and 2.

The fluid distribution and vent manifold assembly 228 in the alternative system 220 exemplifies an advantageous assembly technique which greatly reduces assembly time and expense. Fluid distribution systems which are used to convey fluid in bulk from a single source to a plurality of separate vessels inevitably must utilize flexible tubing, such as the conduits 232, 234. Such conduits are typically coupled in the end-user processing facility to hose barbs on each end, with or without bonding or hose clamps and the like to prevent leakage. When assembling such a fluid distribution system, the time required to make each of these connections is significant, adding to assembly costs. Moreover, mistakes in the lab can occur when connecting numerous conduits to receptacles.

The fluid distribution and vent manifold assembly 228 is assembled in much less time than previous systems and with a greatly reduced margin for mistakes. In general, the assembly method involves pre-attaching the flexible tubing to manifold components in the manufacturing facility, and then joining the manifold components and flexible tubing together using shells and fusion. Because the tubing can be more rapidly attached to the manifold components, as opposed to connecting the tubing between a manifold assembly and vessels after the fact, the entire process is speeded up.

Figure 19A:
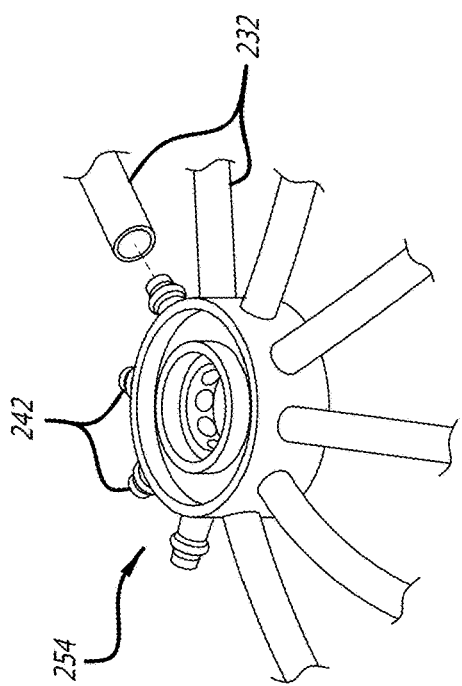
FIGS. 19A and 19B are perspective views of a fluid distribution manifold and vent distribution manifold, respectively, of the assembly of FIG. 14 during intermediate steps in the integration with flexible conduits.
Figure 19B:
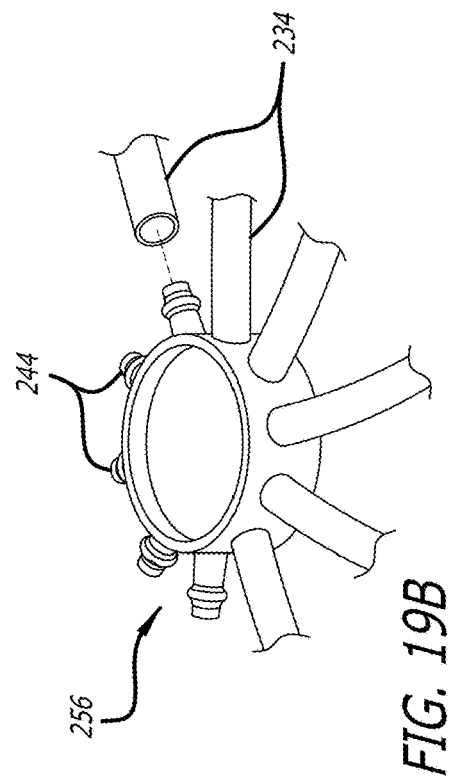

To illustrate the exemplary assembly method, reference is made to the perspective views of FIGS. 19A and 19B of the fluid distribution manifold 254 and vent distribution manifold 256. Initially, flexible outlet conduits 232 are attached to each of the outlet fittings 242 of the fluid distribution manifold 254. Simultaneously, or sequentially, flexible inlet conduits 234 are attached to each of the inlet fittings 244 emanating outward from the vent distribution manifold 256. In the illustrated embodiment, each of the fittings 242, 244 are configured similar to hose barbs, though instead of a series of circular beads only one may be necessary. Each of the circular beads is sized slightly larger than the inner diameter of the associated flexible conduit, such that the conduits can be pushed onto the fittings in an interference fit.

Figure 20:
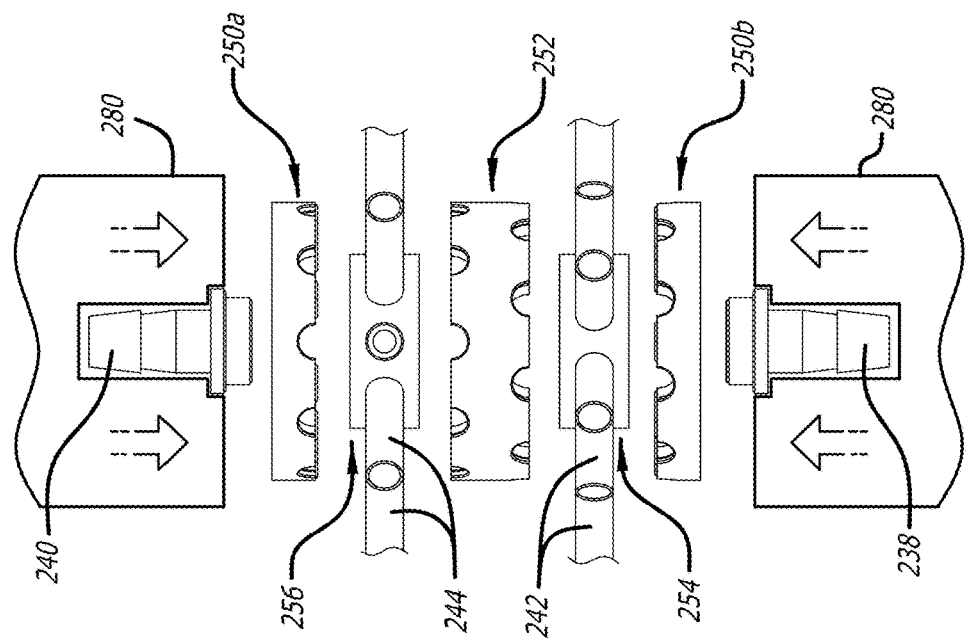
FIG. 20 is an exploded elevational view of the fluid distribution and vent manifold assembly integrated with flexible conduits in a process of pressing and bonding the components together.

Subsequently, the various components of the manifold assembly 228 are stacked as seen in FIG. 20. Opposing presses 280 are used to compress this stacked assembly of components together, applying pressure and vibration or heat/current to fuse the contacting components. Again, the opposing presses 280 have pressing surfaces that mate closely with the stacked shells 250a, 250b. A preferred method for fusing is sonic welding, though adhesives or thermal or electro-thermal welding may be used as an alternate or accompanying method.

Sonic welding involves first preparing plastic parts to be joined by ensuring that their surfaces are clean and free from contaminants. Any protective coatings, films, or adhesives are removed from the joining areas. The plastic parts are positioned between the opposing presses 80, which are designed to hold them securely during the welding process. The two presses 280 consist of a stationary anvil and a movable horn (also called an ultrasonic stack) that applies the ultrasonic vibrations to the parts. The opposing presses 280 applying a consistent pressure to ensure proper mating of the surfaces of the plastic parts into contact with each other (i.e., joints), in this case the stacked shells 250a, 250b, as seen in FIGS. 13 and 16A/16B. The amount of pressure applied depends on the specific materials and their thickness. The rest of the process may be as described above with respect to FIG. 4.

It should be noted that the various components of the manifold assembly 228 are shaped to nest together so that when they are bonded together they form the compact cylindrical body 236 seen in FIG. 13. For instance, with reference to FIG. 14, the upper and lower shells 250a, 250b have flat outer faces but define a plurality of radially-oriented channels or grooves 290 on their inner faces. These grooves 290 fit around each of the projecting fittings 242, 246 in the manifolds 254, 256. Similarly, the central shell 252 has a circular array of radially-oriented channels or grooves 292 on both its faces which also receive the projecting fittings 242, 246. FIG. 13 shows the resulting assembly 228 in which the fittings 242, 244 remain within the cylindrical outer boundary. This serves the purpose of protecting the integrity of the fittings 242, 244 from damage, but more importantly clamps the inner ends of the flexible conduits 232, 234 around the fittings. That is, the curvature of the radial grooves 290, 292 is matched to or slightly less than the outer diameter of the conduits 232, 234, which compresses the conduits around the circular beads on each of the fittings 242, 246. This ensures a good fluid-tight fit between the conduits and fittings, much like a hose clamp or the like. Moreover, the compression provided by sandwiching the conduits between the grooves 290, 292 ensures that the conduits cannot be pulled loose from the respective fitting.

When the upper and lower shells 250a, 250b and central shell 252 sandwich the manifolds 254, 256 in between, the shells contact each other along pie-shaped raised segments 294 therebetween for bonding the assembly together. The pie-shaped raised segments 294 border the radially-oriented grooves 290, 292 and have outer edges at the outer circumference of the respective shells 250a, 250b, 252.

Figure 14A:
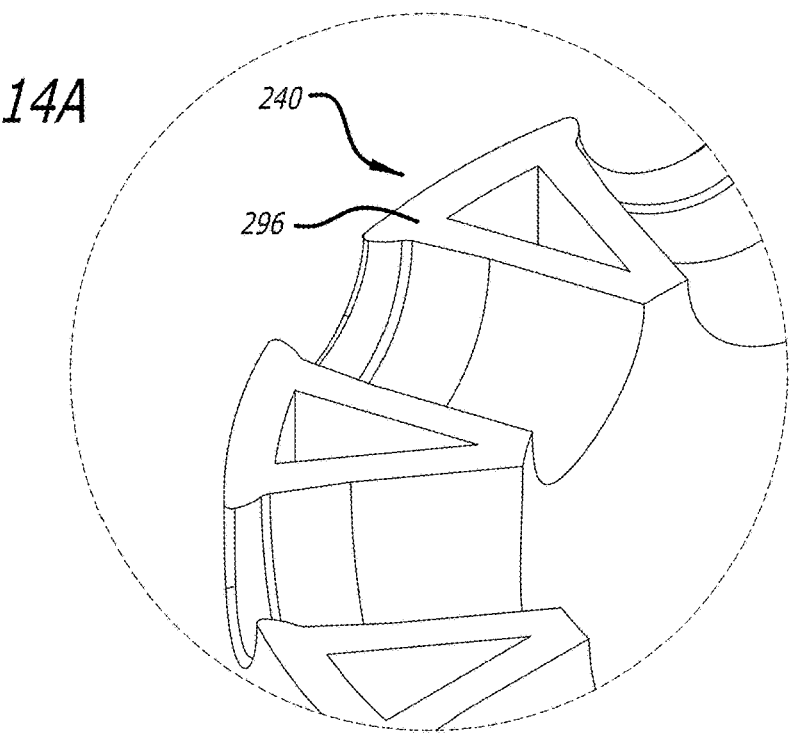
FIGS. 14A and 14B are enlargements of two of the shells showing raised joint surfaces that bond with the joint surfaces of the adjacent shell(s)
Figure 14B:
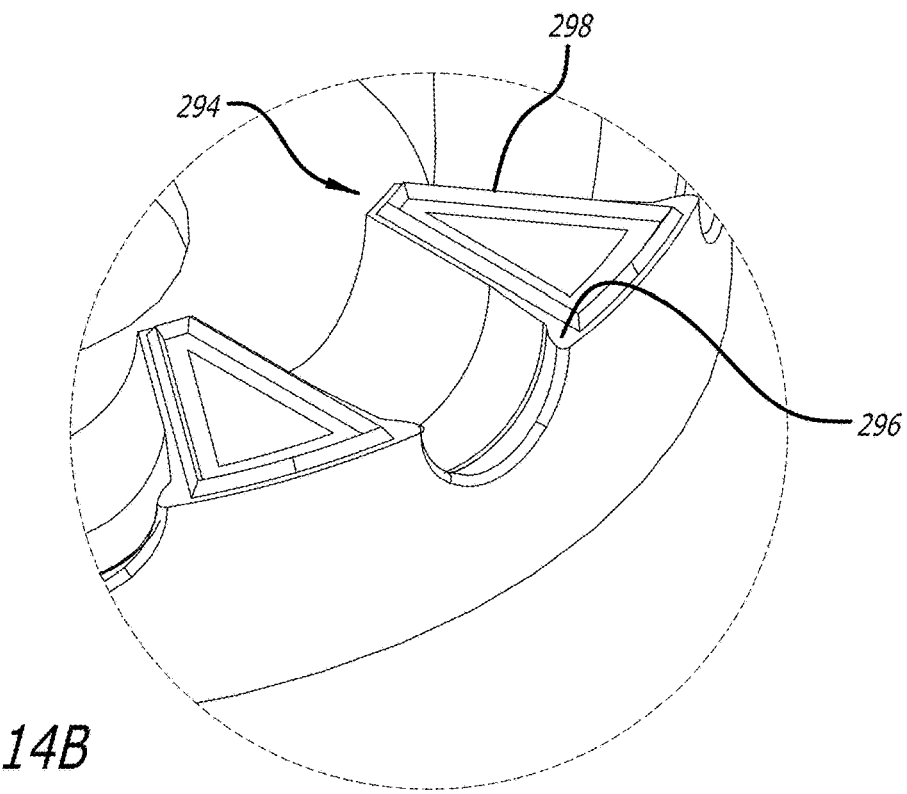

As best seen in FIGS. 14A and 14B, each of the shells 250a, 250b, 252 has joint surfaces 296 along the raised segments 294 that match up with and contact the joint surfaces of the adjacent shell. That is, the upper shell 250a has joint surfaces 296 on a lower face, the lower shell 250b has joint surfaces 296 on an upper face, and the central shell 252 has joint surfaces 296 on both upper and lower faces. The joint surfaces 296 extend along the raised edges of the segments 294. Juxtaposition of these joint surfaces 296 on the shells 250a, 250b, 252 enables them to be bonded together. As described herein, bonding can be done in a number of ways, including adhesives, fusion or electrofusion welding, and sonic welding. The present application contemplates an assembly process that utilizes sonic welding to avoid the use of chemical adhesives.

Again with reference to FIGS. 14A and 14B, one of each contacting pair of raised segments 294 has narrow ribs 298 that contact the colinear and planar joint surfaces 296 on the second one of the pair to direct the energy along more of a line as opposed to an area for faster heating and melting. The narrow ribs 298 in the illustrated embodiment are triangular in cross-section, though other shapes may be used, as detailed below.

Figure 21:
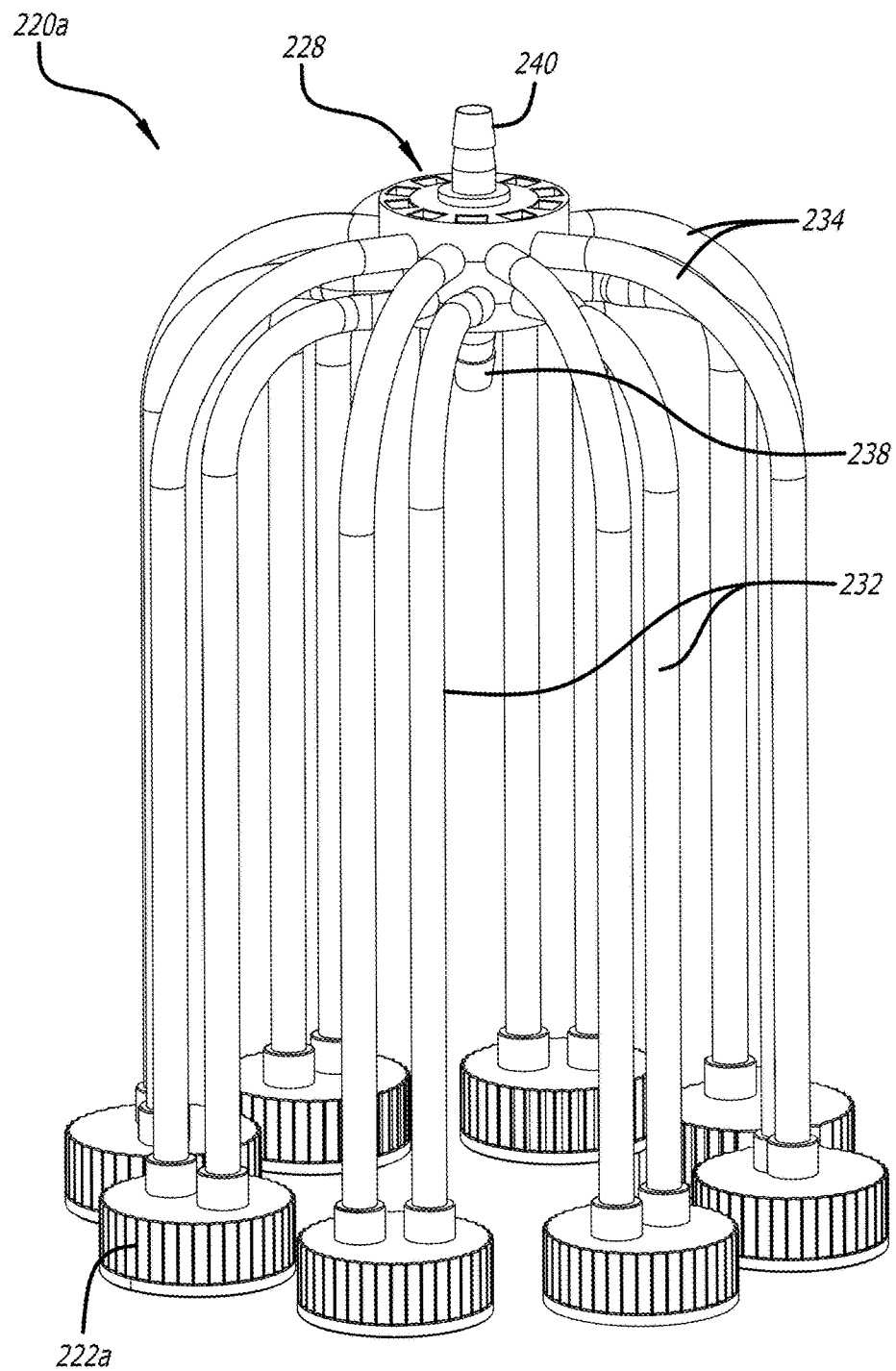
FIG. 21 is a perspective view of a deliverable/consumable sterile fluid distribution subsystem for attaching to receptacles enabling filled with fluid from a single source.

FIG. 21 is a perspective view of a deliverable/consumable sterile fluid distribution subsystem 220a for attaching to receptacles, enabling filling with fluid from a single source. The subsystem 220a forms a part of the larger fluid distribution system 220 seen in FIG. 11. The subsystem 220a can be rapidly and efficiently assembled in the manufacturing facility, as explained above, and packaged in a sterile form for instant integration into the larger system 220 in the lab.

The fluid distribution subsystem 220a comprises the manifold assembly 228 having the inlet connector 238 and outlet connector 240, as described above. Fluid outlet conduits 232 and a fluid inlet conduits 234 are pre-assembled with the manifold assembly 228, as described above. Finally, the conduits 232, 234 are coupled to the receptacle caps 222a. By producing and shipping the subsystem 220a in this form in a sterile packaging, the end-user need only connect the remaining elements of the overall system 220 such as screwing sterile receptacles 222 onto the caps 222a and attaching a fluid source to the inlet connector 238, and a common vent to the outlet connector 240. These final assembly steps take a matter of minutes, and are nearly fool-proof in terms of making the right connections, after which the end-user can begin filling the receptacles with fluid. Once processing within the receptacles 222 is complete, the conduits 232, 234 to each may be closed off, such as with the clamps or flow control valves 110, 112 seen in FIG. 5, and then severed to disconnect the closed receptacles 222 from the larger fill system. The subsystem 220a is relatively inexpensive to manufacture, and thus is a consumable product which can be disposed of after use.

Figure 22:
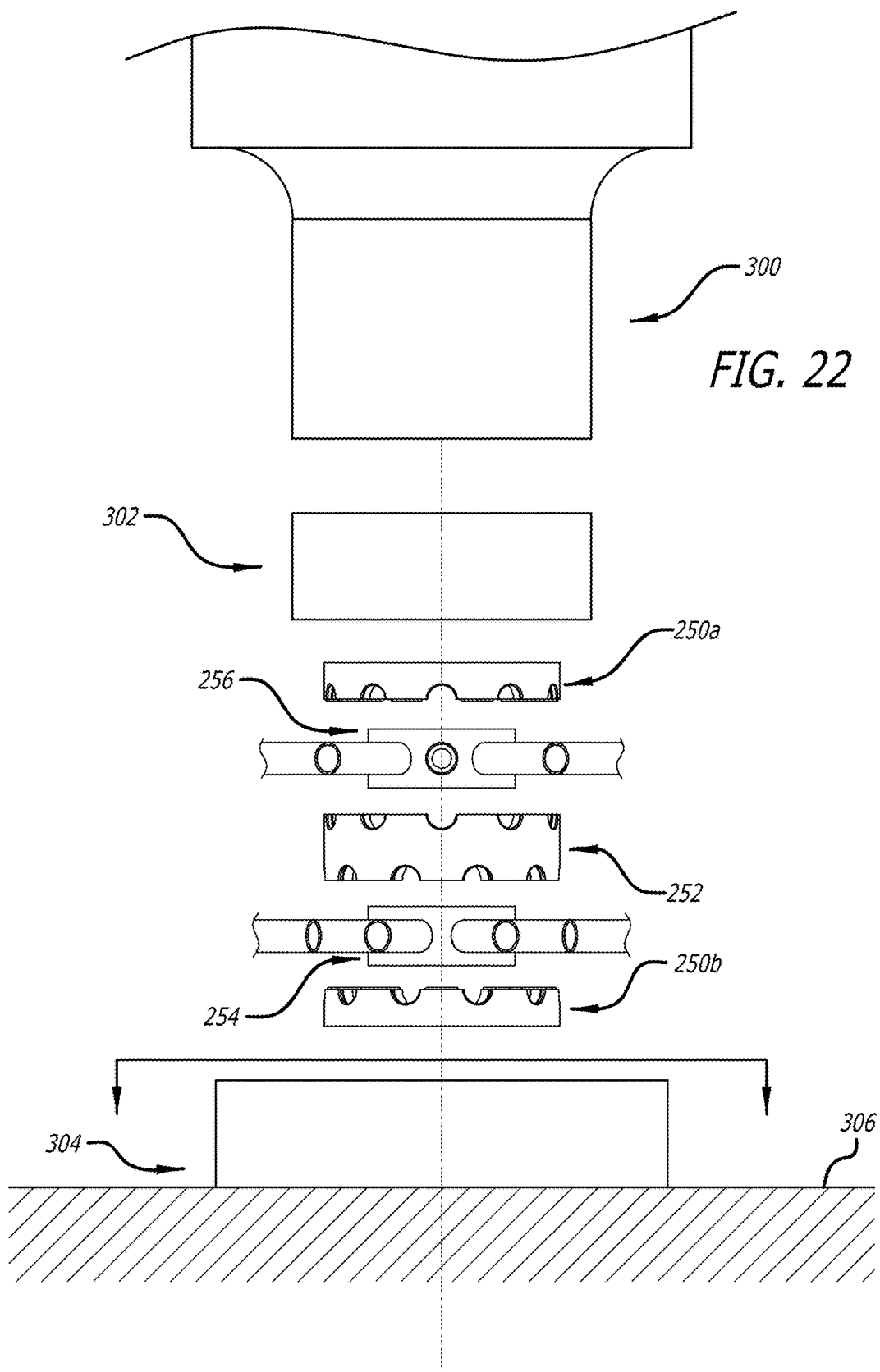
FIG. 22 is an exploded view of a typical ultrasonic bonding stack for joining the parts to form the fluid distribution and vent manifold assembly of FIG. 13.

FIG. 22 is an exploded view of a typical ultrasonic bonding stack for joining the parts to form the fluid distribution and vent manifold assembly of FIG. 13. The bonding stack begins with an ultrasonic vibration horn 300 positioned above an upper nesting block 302. The ultrasonic vibration horn 300 is typically formed of stainless steel or titanium, or other similar metals. The stack of upper and lower shells 250a, 250b and middle shell 252 with the manifolds 254, 256 and flexible tubes interpose therebetween remains the same as described above. The central inlet connector 238 and central outlet connector 240 seen in FIG. 20 may also be accommodated and bonded with the assembly, but are not shown for the sake of brevity. The stack parts are supported on a lower nesting block 304 that rests on a stable foundation 306, such as a table.

Figure 23:
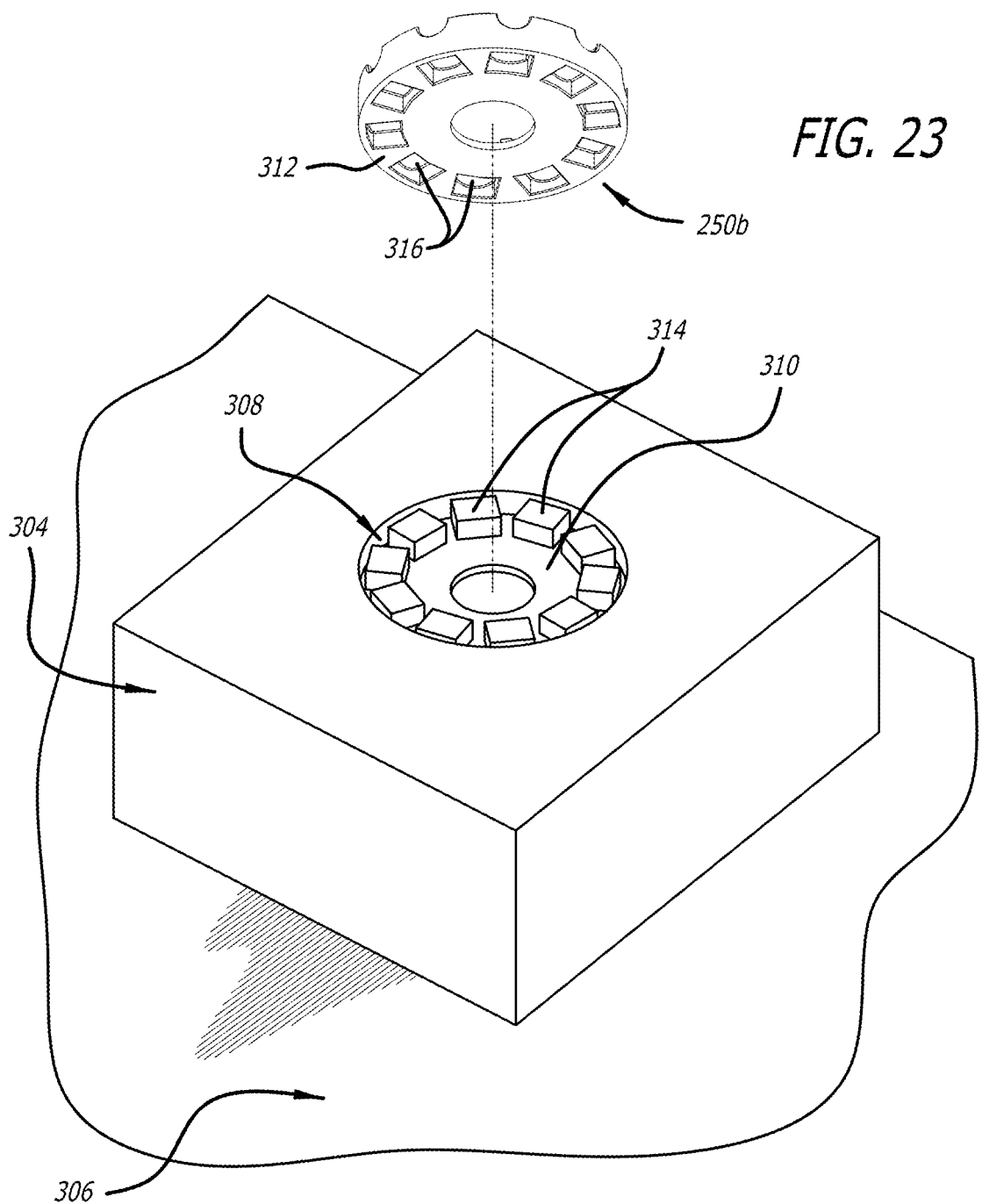
FIG. 23 is an exploded perspective view of a base and nesting cavity for receiving the stacked fluid distribution and vent manifold assembly of FIG. 22.

FIG. 23 is an exploded perspective view of the foundation 306 and lower nesting block 304 thereon showing a nesting cavity 308 for receiving the stacked fluid distribution and vent manifold assembly. The lower bonding shell 250b is seen in an upturn orientation so as to view the contours on its lower surface 312 which rests on a floor 310 of the nesting cavity 308. The nesting cavity further includes a plurality of raised block 314 which fit within similarly-sized cavities 316 in the bottom surface of the lower bonding shell 250b. The nesting cavity 308 may be machined in the lower nesting block 304, which may be formed of aluminum, stainless steel, or the like.

Although not shown, the underside of the upper nesting block 302 has a similar shaped to mate with the top surface of the upper bonding shell 250a, seen in FIG. 14. The close-fitting or "nesting" contact between the nesting blocks 302, 304 and the bonding shells 250a, 250b ensures excellent contact therebetween so that the ultrasonic energy directed from the horn 300 above through the stack is absorbed mainly in the contacting surfaces between the manifold assembly parts, as opposed to creating incidental vibrations or energy losses between the parts and the flanking bonding equipment. That is, the stacked assembly seen in FIG. 22 creates an extremely stable stack of the manifold assembly parts which is thus prone to vibrate at the contact surfaces between the shells 250a, 250b, 252.

FIG. 24 is an exploded perspective view of an assembly 400 of a reducing straight junction 402 flanked by two bonding shells 404, 406 for connecting the junction with flexible tubes (not shown) in the manners described previously. The reducing straight junction 402 has a smaller fitting 408 at one end and a large fitting 410 on the other end. The bonding shells 404, 406 have concave receiving surfaces that together conform around each of the fluid fittings and clamp the tubular conduits onto the circular beads and juxtaposed joint surfaces that come into contact with each other. The inner contours of the flanking shells 404, 406 thus reflect the different sized fittings 408, 410, and differently-sized flexible tubes will be joined to the fittings. FIG. 24A is an enlargement of the shell 404 showing ultrasonic concentrator ribs 412 running along joint surfaces thereof. Each of the concentrator ribs 412 has a triangular cross section so that it contacts a flat edge on the other shell 406 along a line, as opposed to across an area. This directs the ultrasonic energy along the apex of the concentrator rib 412 in order to provide quicker melting.

FIG. 25 is an exploded perspective view of an assembly 420 of two bonding shells 422, 424 flanking a standard elbow junction 426 for connecting the junction with flexible tubes (not shown) in the manners described previously. The elbow junction 426 has two equal-sized fittings 428, 430 on opposite ends. The bonding shells 422, 424 have concave receiving surfaces that together conform around each of the fluid fittings 428, 430 and clamp the tubular conduits onto the circular beads and juxtaposed joint surfaces that come into contact with each other. FIG. 25A is an enlargement of the shell 422 showing an ultrasonic concentrator rib 432 running along joint surfaces thereof. Each of the concentrator ribs 432 has a triangular cross section so that it contacts a flat edge on the other shell 424 along a line, as opposed to across an area. This directs the ultrasonic energy along the apex of the concentrator rib 432 in order to provide quicker melting.

Figure 26A:
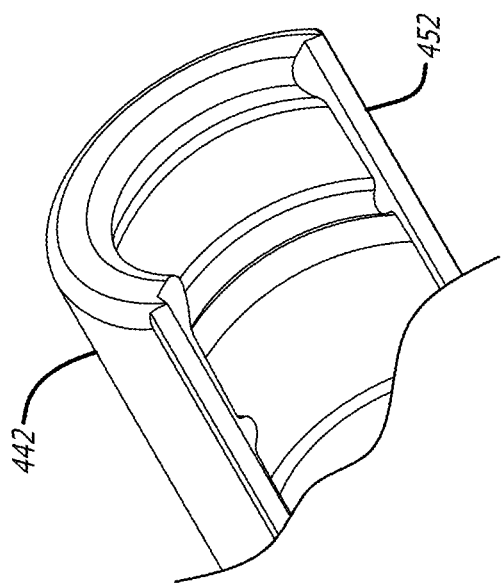
FIG. 26A is an enlargement of one of the shells showing an ultrasonic concentrator rib.
Figure 26:
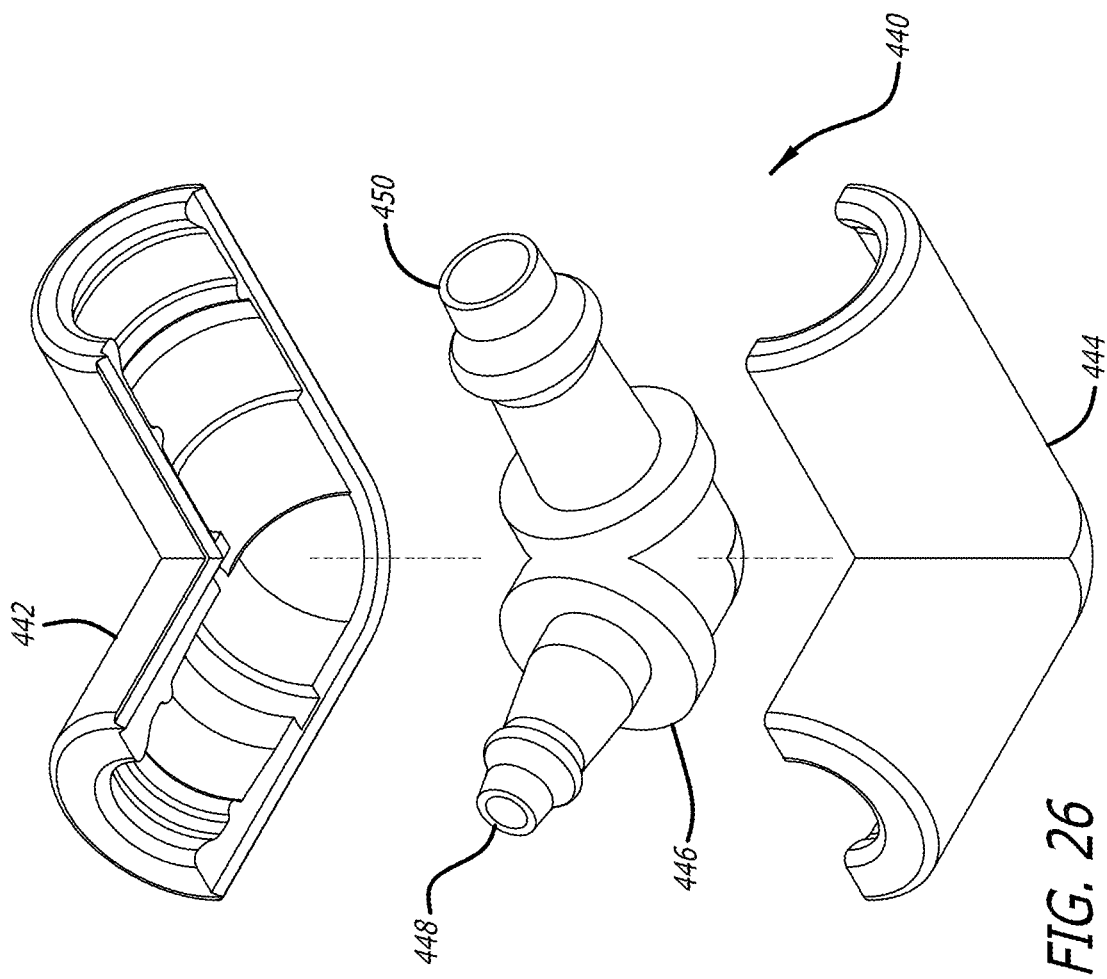
FIG. 26 is an exploded perspective view of a reducing elbow junction flanked by two bonding shells for connecting the junction with flexible tubes.

FIG. 26 is an exploded perspective view of an assembly 440 of two bonding shells 442, 444 flanking a reducing elbow junction 446 for connecting the junction with flexible tubes (not shown) in the manners described previously. The reducing elbow junction 446 has a smaller fitting 448 opposite a larger fitting 450 on the other end. The inner contours of the flanking shells 442, 444 thus reflect the different sized fittings 448, 450, and differently-sized flexible tubes will be joined to the fittings. The bonding shells 442, 444 have concave receiving surfaces that together conform around each of the fluid fittings 448, 450 and clamp the tubular conduits onto the circular beads and juxtaposed joint surfaces that come into contact with each other. FIG. 26A is an enlargement of the shell 442 showing an ultrasonic concentrator rib 452 running along joint surfaces thereof. Each of the concentrator ribs 452 has a triangular cross section so that it contacts a flat edge on the other shell 444 along a line, as opposed to across an area. Again, this directs the ultrasonic energy along the apex of the concentrator rib 452 in order to provide quicker melting.

FIG. 27 is an exploded perspective view of an assembly 460 of two bonding shells 462, 464 flanking a reducing T-junction 466 for connecting the junction with flexible tubes (not shown) in the manners described previously. The reducing T-junction junction 466 has a large fitting 468 arranged perpendicular to two co-linear smaller fittings 470 on opposite ends. The bonding shells 462, 464 have concave receiving surfaces that together conform around each of the fluid fittings 468, 470 and clamp the tubular conduits onto the circular beads and juxtaposed joint surfaces that come into contact with each other. As before, the inner contours of the flanking shells 462, 464 thus reflect the different sized fittings 468, 470, and differently-sized flexible tubes will be joined to the fittings. FIG. 27A is an enlargement of the shell 462 showing an ultrasonic concentrator rib 472 running along joint surfaces thereof. Each of the concentrator ribs 472 has a triangular cross section so that it contacts a flat edge on the other shell 464 along a line, as opposed to across an area. This directs the ultrasonic energy along the apex of the concentrator rib 472 in order to provide quicker melting.

Figure 28A:
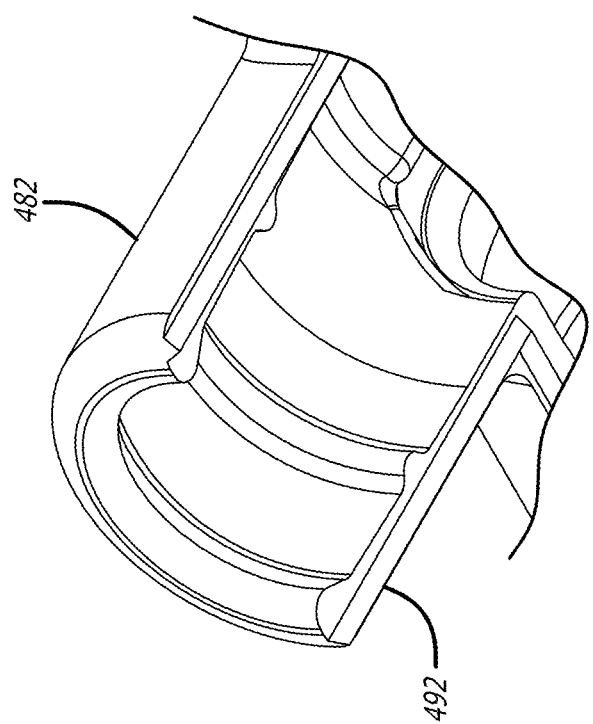
FIG. 28A is an enlargement of one of the shells showing an ultrasonic concentrator rib.
Figure 28:
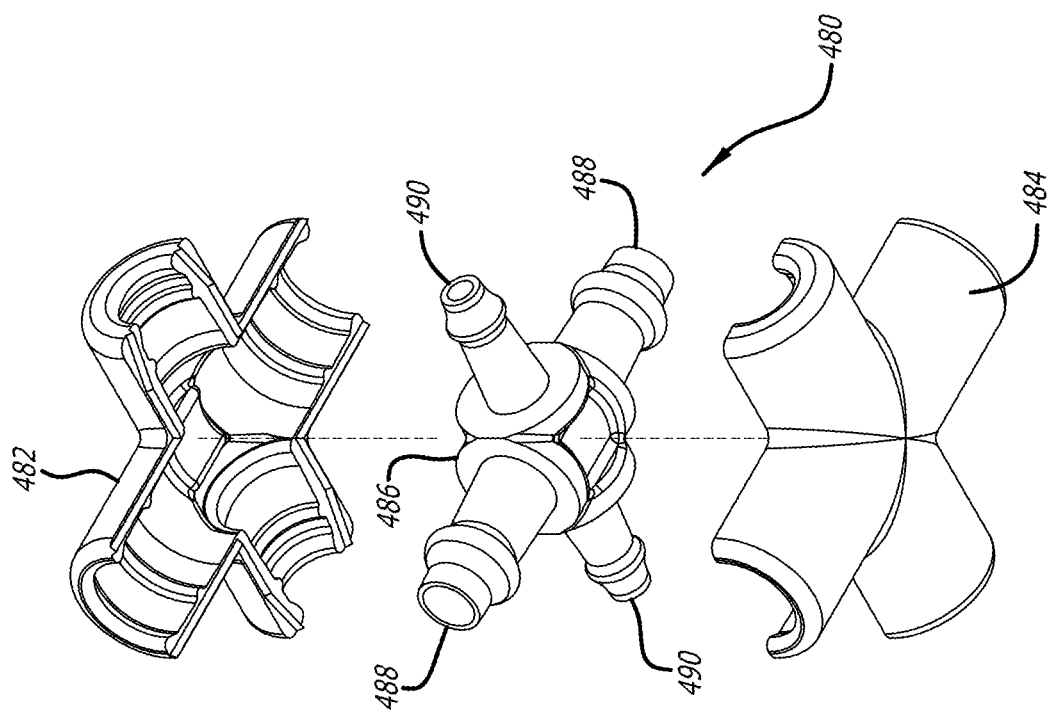
FIG. 28 is an exploded perspective view of a reducing cross-junction flanked by two bonding shells for connecting the junction with flexible tubes.

FIG. 28 is an exploded perspective view of an assembly 480 of two bonding shells 482, 484 flanking a reducing cross-junction 486 for connecting the junction with flexible tubes (not shown) in the manners described previously. The reducing cross-junction junction 486 has a pair of co-linear large fittings 488 arranged perpendicular to two co-linear smaller fittings 490 on opposite ends. The bonding shells 482, 484 have concave receiving surfaces that together conform around each of the fluid fittings 488, 490 and clamp the tubular conduits onto the circular beads and juxtaposed joint surfaces that come into contact with each other. As before, the inner contours of the flanking shells 482, 484 reflect the different sized fittings 488, 490, and differently-sized flexible tubes will be joined to the fittings. FIG. 28A is an enlargement of the shell 482 showing an ultrasonic concentrator rib 492 running along joint surfaces thereof. Each of the concentrator ribs 492 has a triangular cross section so that it contacts a flat edge on the other shell 484 along a line, as opposed to across an area, to direct the ultrasonic energy along the apex of the concentrator rib 492 in order to provide quicker melting.

FIG. 29 is an exploded perspective view of an assembly 500 of two bonding shells 502, 504 flanking a reducing Y-junction 506 for connecting the junction with flexible tubes (not shown) in the manners described previously. The reducing Y-junction junction 506 has a large fitting 508 extending along an axis that bisects two angled smaller fittings 510 on the opposite end of the junction. The bonding shells 502, 504 have concave receiving surfaces that together conform around each of the fluid fittings 508, 510 and clamp the tubular conduits onto the circular beads and juxtaposed joint surfaces that come into contact with each other. The inner contours of the flanking shells 502, 504 reflect the different sized fittings 508, 510, and differently-sized flexible tubes will be joined to the fittings. FIG. 29A is an enlargement of the shell 502 showing an ultrasonic concentrator rib 512 running along joint surfaces thereof. Each of the concentrator ribs 512 has a triangular cross section so that it contacts a flat edge on the other shell 504 along a line, as opposed to across an area. This directs the ultrasonic energy along the apex of the concentrator rib 512 in order to provide quicker melting.

FIG. 30 is an exploded elevational end view of the assembly of the reducing straight junction 406 and flanking shells 402, 404 of FIG. 24. Concentrator ribs 412 are shown on the joint surfaces of the upper shelf 402, while the lower shell 404 has flat joint surfaces. These are seen in enlargement in FIG. 31A and FIG. 31B. Finally, FIG. 32 is a schematic view of the presumed melt pattern that occurs when the two shells 402, 404 are joined together using ultrasonic energy. That is, the apex of the concentrator rib 412 is in contact with the flat edge 414 and thus all of the ultrasonic energy in between the two parts is focused at the apex. The concentrator rib 412 then melts very quickly and spreads out between the two contact edges, as shown schematically by stippling.

FIGS. 33-36 are schematic views of alternative configurations of ultrasonic concentrators between two edges being bonded together. It should be understood that these are not the only configurations of concentrators or energy or directors possible. An energy director is either a special angle that intersects with a flat surface or a small projection that rises from a flat surface. When the sonic resonance is focused into the part, this tiny point or line will melt instantly creating a cascade effect throughout both of the surfaces that will be bonded. Without an energy director, the chances of getting a good and repeatable weld are reduced. Triangular cross-sections are good for concentrating energy along a line, though curved shapes that narrow to a generatrix or other narrowing shapes such as described below are also contemplated.

Figure 33:
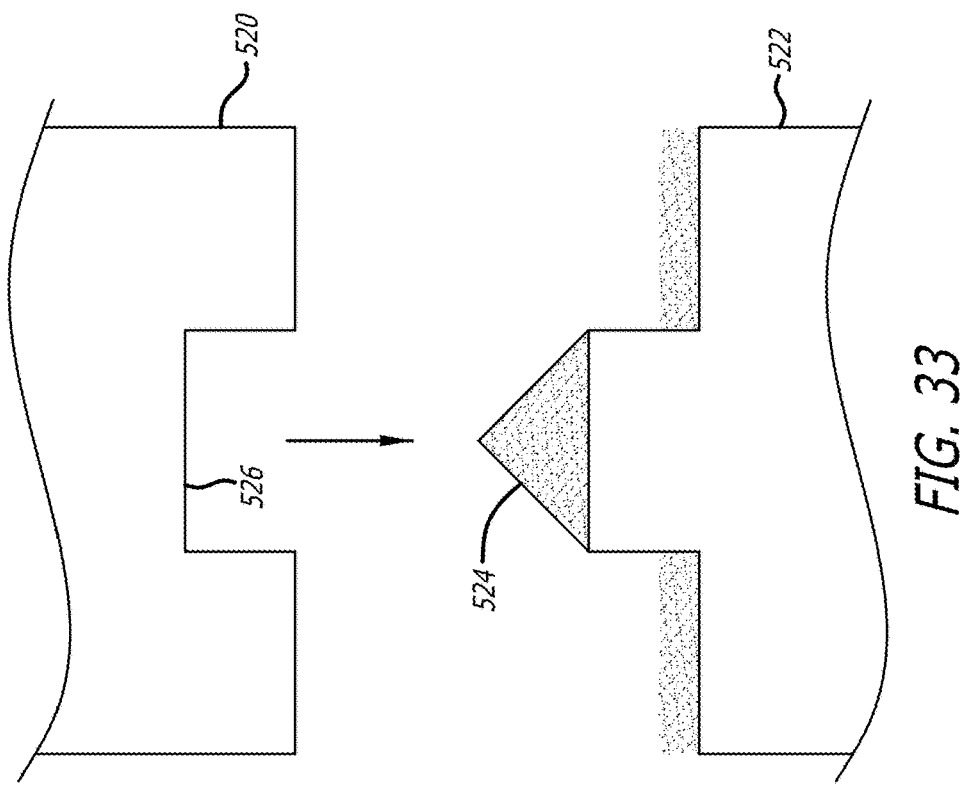

In a first example of an alternative energy director, FIG. 33 a shows the contact edges of a pair of shells 520, 522. The lower shell 522 has a triangular-shaped projection 524 as an energy director that fits within a rectangular-shaped cavity 526 in the upper shelf 520. When the two shells are brought together, ultrasonic vibrations will heat up the triangular projection 524 first which thus melts quickly and spreads out between the contact surfaces, as indicated schematically by stippling.

Figure 34:
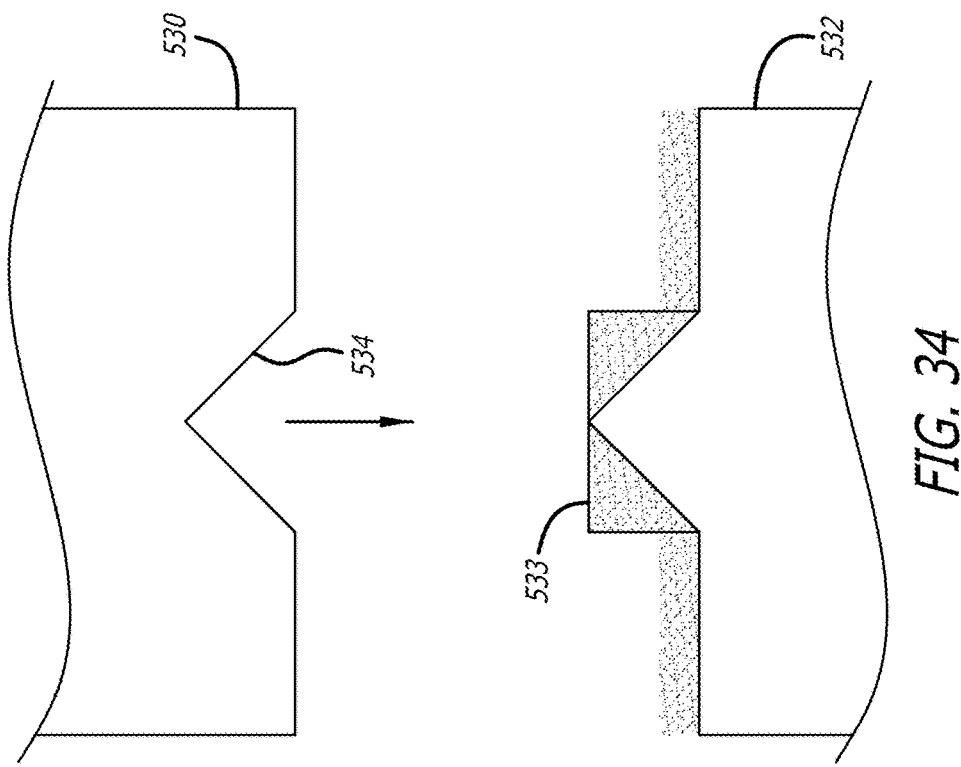
FIGS. 33-36 are schematic views of alternative configurations of ultrasonic concentrators between two edges being bonded together.

FIG. 34 shows the contacting edges of a pair of shells 530, 532 coming together. The lower shell 532 features a generally rectangular projection 533 with upper corners that fits within a triangular cavity 534 in the upper shelf 530. The corners of the rectangular projection 533 thus contact the size of the triangular cavity 534 and melt first. The presumed area of melted material is indicated schematically with stippling.

Figure 35:
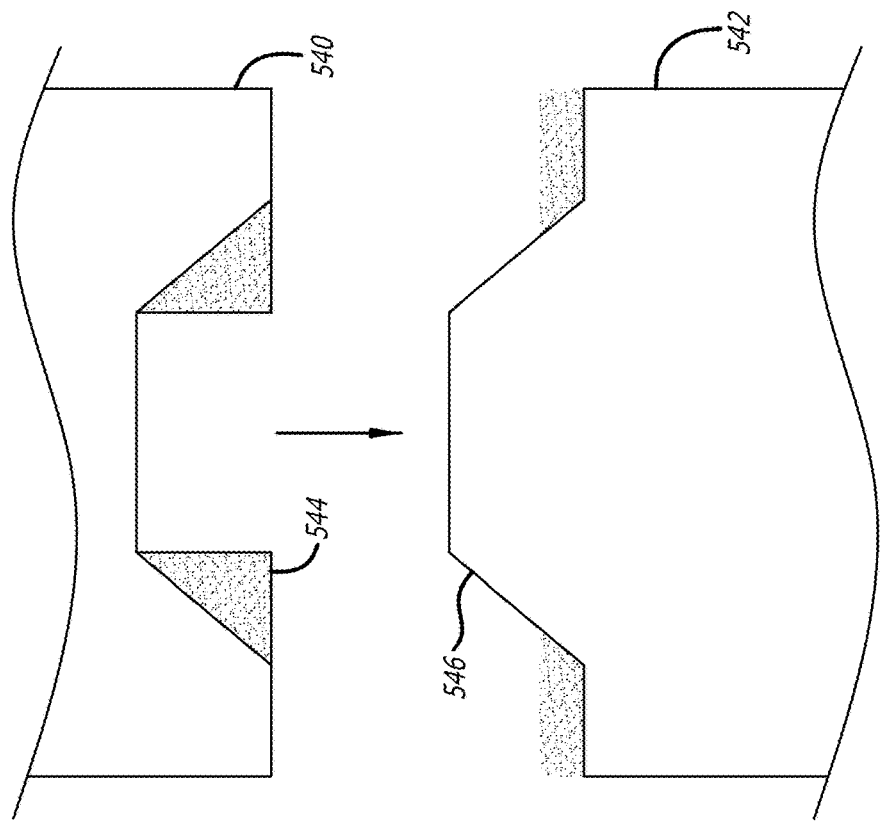

FIG. 35 shows an upper shelf 540 at a lower shell 542 having a different energy director configuration. Upper shell 540 has a rectangular cavity that defines corners 544. The lower shell 542 has a projection 546 that is trapezoidal, such that the upper corners of the trapezoid contact the corners 544 of the rectangular cavity on the upper shell 540, thus concentrating the ultrasonic energy along these contact lines. Again, the presumed area of melting is shown schematically with stippling.

Figure 36:
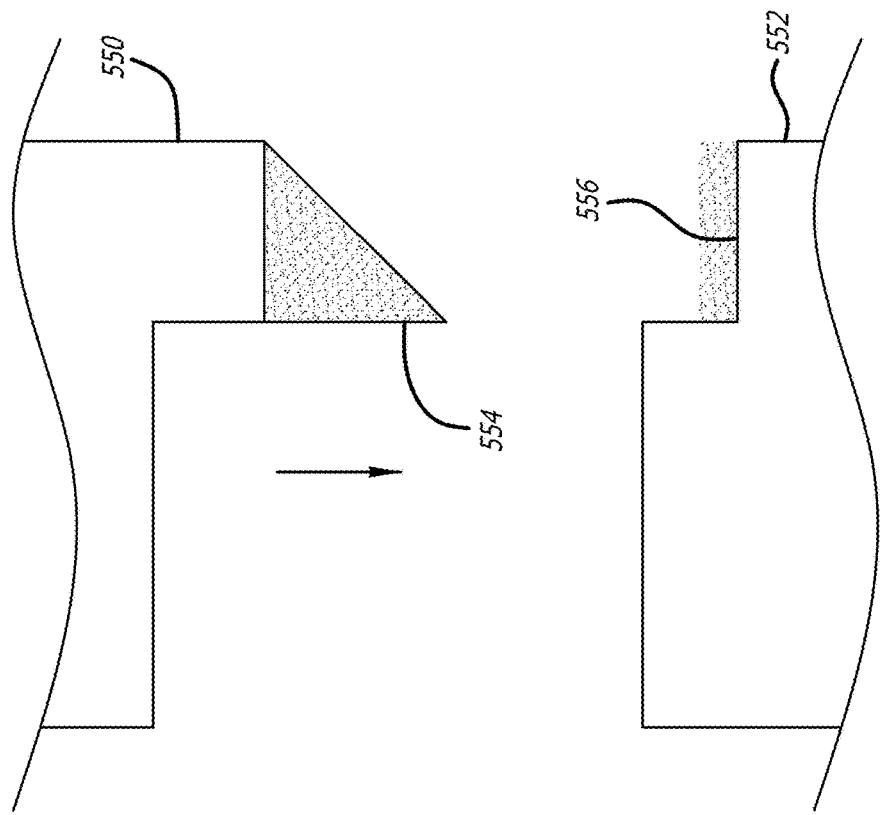

Finally, FIG. 36 shows an asymmetric arrangement where the edge of an upper shell 550 is brought together with the edge of a lower shell 552. The upper shell 550 has a generally triangular projection 554 extending downward on one lateral side which fits into a rectangular step 556 on the lower shell 552. The apex of the triangular projection 554 thus heats up first, and the presumed areas that melt and bond together are indicated schematically with stippling.

Terms such as top, bottom, left and right are used herein, though the fluid manifolds may be used in various positions such as upside down. Thus, some descriptive terms are used in relative terms and not absolute terms.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It is claimed:

1. A package comprising:
    a sterile consumable fluid flow subsystem, comprising:
        a) a first manifold having a first central fluid connector opening to a central plenum chamber which fluidly communicates with at least four radially outwardly-directed generally tubular fluid fittings, each of the fluid fittings having an external circular bead;
        b) a plurality of flexible tubular conduits each fitting over and being coupled to an associated one of the plurality of fluid fittings, wherein the external circular bead of each fluid fitting has a diameter larger than an inner diameter of the associated tubular conduit, the fluid junction and coupled tubular conduits defining a subassembly; and
        c) two opposing shells sandwiched on opposite sides of the subassembly, the shells having mating concave receiving surfaces that together conform around each of the fluid fittings and clamp the tubular conduits onto the circular beads, the opposing shells having juxtaposed joint surfaces that come into contact with each other and are welded together; and
    sterile packaging containing the subsystem, wherein the subsystem may be removed from the sterile packaging and immediately connected to one or more sterile processing vessel.

2. The package of claim 1, wherein the circular beads are selected from a group consisting of a rounded bead and a barbed bead.

3. The package of claim 1, wherein the mating concave receiving surfaces comprise semi-cylindrical inner wall portions each with a semi-circular inward rib provided on a radially outward extent thereof.

4. The package of claim 1, wherein the juxtaposed joint surfaces on each pair of opposing shells are co-planar.

5. The package of claim 1, wherein the fluid junction comprises a first manifold having a central plenum chamber and at least four radially outwardly directed fluid fittings in fluid communication with the plenum chamber.

6. The package of claim 5, further including a second manifold having a central plenum chamber and at least four radially outwardly directed fluid fittings in fluid communication with the plenum chamber.

7. The package of claim 6, wherein the subsystem further includes a first central fluid connector bonded to a lower face of the first manifold and a second central fluid connector bonded to an upper face of the second manifold.

8. The package of claim 5, wherein the subsystem further comprises receptacle caps attached to ends of each of the tubular conduits.

9. A package comprising:
    a sterile consumable fluid fill subsystem, comprising:
        a) a first manifold having a first central fluid connector opening to a central plenum chamber which fluidly communicates with at least four radially outwardly directed generally tubular fluid fittings, each of the fluid fittings having an external circular bead;
        b) a plurality of flexible tubular conduits each fitting over and being coupled to an associated one of the plurality of fluid fittings, wherein the external circular bead of each fluid fitting has a diameter larger than an inner diameter of the associated tubular conduit, the fluid junction and coupled tubular conduits defining a subassembly;

c) two opposing shells sandwiched on opposite sides of the subassembly, the shells having mating concave receiving surfaces that together conform around each of the fluid fittings and clamp the tubular conduits onto the circular beads, the opposing shells having juxtaposed joint surfaces that come into contact with each other and are welded together; and d) receptacle caps attached to ends of each of the tubular conduits; and sterile packaging containing the subsystem, wherein the subsystem may be removed from the sterile packaging and a fluid source attached to the first central fluid connector while the receptacle caps are connected to sterile receptacles for simultaneous filling.

10. The package of claim 9, further including a second manifold having a central plenum chamber and at least four radially outwardly directed fluid fittings in fluid communication with the plenum chamber, wherein the fluid fill subsystem comprises, stacked from top to bottom, an upper one of the shells, the second manifold, a central one of the shells, the first manifold, and a lower one of the shells.

11. The package of claim 10, wherein the first and second manifolds have the same number of fluid fittings.

12. The package of claim 11, wherein the first and second manifolds each have eight fluid fittings.

13. The package of claim 10, further including a second central fluid connector opening to the central plenum chamber of the second manifold.

14. The package of claim 10, wherein the first central fluid connector is bonded to a lower face of the first manifold and the second central fluid connector is bonded to an upper face of the second manifold.

15. The package of claim 10, further including a common vent filter connected to the second central fluid connector.

16. The package of claim 10, wherein the upper one of the shells, the central one of the shells, and the lower one of the shells are disk-shaped members that when stacked together form a cylindrical frame.

17. The package of claim 9, wherein the circular beads are selected from a group consisting of a rounded bead and a barbed bead.

18. The package of claim 9 wherein the juxtaposed joint surfaces on each pair of opposing shells are co-planar.

* * * * *